(12) United States Patent
Olschan et al.

(10) Patent No.: US 10,580,060 B2
(45) Date of Patent: Mar. 3, 2020

(54) REQUISITION SYSTEM FOR SUPPLY/MAINTENANCE OF SAFETY ITEMS

(71) Applicant: Acme United Corporation, Fairfield, CT (US)

(72) Inventors: Brian S. Olschan, Madison, CT (US); Michael A. Healey, York, ME (US)

(73) Assignee: Acme United Corporation, Fairfield, CT (US)

( * ) Notice: Subject to any disclaimer, the term of this patent is extended or adjusted under 35 U.S.C. 154(b) by 240 days.

(21) Appl. No.: 15/691,131

(22) Filed: Aug. 30, 2017

(65) Prior Publication Data

US 2018/0060939 A1 Mar. 1, 2018

Related U.S. Application Data

(60) Provisional application No. 62/408,337, filed on Oct. 14, 2016, provisional application No. 62/381,188, filed on Aug. 30, 2016.

(51) Int. Cl.
| | |
|---|---|
| *G06Q 30/00* | (2012.01) |
| *G06Q 30/06* | (2012.01) |
| *G06Q 10/08* | (2012.01) |
| *G06T 11/20* | (2006.01) |
| *G06K 19/06* | (2006.01) |

(52) U.S. Cl.
CPC ..... *G06Q 30/0633* (2013.01); *G06Q 10/0875* (2013.01); *G06T 11/203* (2013.01); *G06K 19/06028* (2013.01); *G06Q 30/018* (2013.01)

(58) Field of Classification Search
CPC .................................................. G06Q 30/06–08
USPC .............................................. 705/26.1–27.2
See application file for complete search history.

(56) References Cited

U.S. PATENT DOCUMENTS

2014/0263674 A1\* 9/2014 Cerveny .......... G06K 19/06028
235/494

\* cited by examiner

*Primary Examiner* — Ethan D Civan
(74) *Attorney, Agent, or Firm* — Alix, Yale & Ristas, LLP

(57) ABSTRACT

A requisition system for safety items such as first aid kits, blood borne pathogen kits, automatic external defibrillators, fire extinguishers, smoke detectors and carbon monoxide detectors automatically generates a list of supplies for such items. The requisition system operates on a mobile electronic device. The user or customer can efficiently undertake an inventory of the replaceable supplies for the safety items and generate a requisition for such safety items. The requisition system provides for an automatic notification alert to the user and also provides an alert notification button to initiate an inventory of replaceable supplies. A requisition of the replaceable supplies is automatically communicated to the supplier. The requisition system also automatically generates a requisition of supplies so that a first aid kit or other safety item fully complies with applicable current safety standards. The requisition system also is operable to implement an automatic replenishment of supplies.

13 Claims, 25 Drawing Sheets

80

ORDER HISTORY REPORT

| | CUSTOMER | | | CUSTOMER BENCHMARK 1 | INDUSTRY BENCHMARK 2 |
|---|---|---|---|---|---|
| | Div A | Div B | Div C | | |
| Item 1 | | | | | |
| Item 2 | | | | | |
| Item 3 | | | | | |
| Item 4 | | | | | |
| Item 5 | | | | | |
| Item 6 | | | | | |
| . . . . | | | | | |
| . . . . | | | | | |
| . . . . | | | | | |

HISTORY ORDER COMPARISON

| Time Period I | Benchmark 1 (I) | Benchmark 2 (I) |
|---|---|---|
| Time Period II | Benchmark 1 (II) | Benchmark 2 (II) |
| Time Period III | Benchmark 1 (III) | Benchmark 2 (III) |

Fig. 14

REQUISITION SYSTEM FOR SUPPLY/MAINTENANCE OF SAFETY ITEMS

CROSS-REFERENCE TO RELATED APPLICATIONS

This application claims the priority of U.S. Provisional Patent Application Nos. 62/381,188 filed on Aug. 30, 2016 and 62/408,337 filed on Oct. 14, 2016, which applications are incorporated herein by reference in their entirety.

BACKGROUND

This disclosure relates generally to devices and methods for maintaining the integrity of safety items, including first aid kits, blood borne pathogen kits, eyewash stations, fire extinguishers, automated external defibrillators (AEDs), smoke detectors, carbon monoxide detectors, respirators and filters. More specifically, this disclosure relates to devices and techniques for ensuring that supplies for safety items and their protocols and related policies are properly maintained.

First aid kits serve a key function in ensuring the safety and welfare of the workforce and the general citizenry. In the safety context, there are numerous regulations and organizational policies which require the presence of first aid kits and which also provide guidance as to the required contents of first aid kits. Compliance with the various regulations is important in reducing or eliminating liability in the workplace and the public sector, as well as to provide a vehicle for promptly administering first aid when required.

It has long been recognized that the procurement and placement of a first aid kit is only an initial step in ensuring the maximum usefulness of the first aid kit. It is extremely important that as supplies from any first aid kit are used or their effectiveness expire, such items be replaced in a prompt and an organized manner. This latter challenge has not been close to universally achieved, and in numerous instances, has been neglected.

While efficient systems for replacing first aid components have been proposed and instituted, it can be said that many such systems very directly depend on the reliability of key personnel in taking steps to ensure maintenance of the first aid kits—which is often a very secondary responsibility of such personnel. In this latter regard, it can be very advantageous if an option of automatic replenishment is provided.

Because proximity to locations is often a key attribute of optimum usage and benefits of first aid kits, larger facilities, organizations and institutions require numerous such kits and, of course, the maintenance and compliance for numerous such kits.

Many of the same considerations discussed above also apply to other safety items. Some safety items such as fire extinguishers, smoke detectors, carbon monoxide detectors and AEDs require periodic maintenance.

The present requisition system seeks to provide a new and improved system for ensuring that the supplies of a first aid kit are properly replaced, that the kit fully complies with updated safety regulations and standards and that the usage of the first aid kit may be effectively monitored and that all safety items are properly maintained, where applicable, the supplies for such safety items properly replaced and the safety items fully comply with updated safety regulations and standards.

A key feature in ensuring that safety items are properly maintained is the ability to efficiently and timely undertake an inventory of replaceable supplies. Because there are numerous safety items and numerous possible first aid kits, for example, in a large facility, it is important that the inventory process be facilitated by readily providing a list of replaceable supplies to the user and allowing the user to conduct the inventory in an efficient manner.

SUMMARY

Briefly stated, a requisition system for a plurality of safety items each having an identifier and one or more replaceable supplies comprises providing a database comprising multiple safety items and a list of replaceable supplies for each safety item. The identifier may be a model number and/or a serial number. The system comprises registering a customer for the safety items and generating a list of replaceable supplies for each customer. The system further comprises indicating an inventory of each said replaceable supply and drafting a requisition of supplies from said list of replaceable supplies and communicating said requisition to a supplier.

The safety items selected from the group consisting of a first aid kit, a blood born pathogen kit, an eyewash station, an automatic external defibrillator and a smoke detector. The notification mode is activated to generate an inventory for selected replaceable supplies. In one embodiment, the notification alert is automatically activated.

The step of indicating the inventory comprises generating an inventory display on a screen selected from the group consisting of FULL, ½, ¼ and EMPTY inventory. The display may take the form of word texts, numbers, bar charts, and other visual indicators. Each said replaceable supply which has a ¼ or EMPTY text is automatically transferred to a draft requisition. A history of requisition of supplies is compiled. A retro list of supplies is generated for bringing a safety item into a full contemporary compliant. The system also comprises registering a subscription to implement automatic replenishment of replaceable supplies.

The requisition system for a plurality of safety items each having a unique identification number and one or more supplies comprises providing a database comprising a plurality of safety items and a list of replaceable supplies for each safety item. The system comprises registering a customer for the safety items and alerting the customer to inventory a selected safety item. The system comprises generating a list of replaceable supplies for a selected safety item and indicating an inventory for each replaceable supply of the selected safety item. The system further comprises drafting a requisition of supplies from the inventory of the list of replaceable supplies finalizing the requisition of supplies and electronically communicating the requisition to a supplier.

The requisition system further comprises activating a notification alert to generate an inventory for selected replaceable supplies and in one embodiment, automatically activating the notification alert.

In one embodiment, the step of indicating an inventory comprises selectively generating an inventory text on a screen selected from the group consisting of FULL, ½, ¼ and EMPTY inventory. In the event that each replaceable supply has a corresponding ¼ or EMPTY text, the replaceable supply is automatically transferred to a draft requisition.

In one embodiment a requisition system for a first aid kit having a plurality of first aid supplies comprises applying a unique serial number to the first aid kit and electronically scanning or entering the serial number. The system further comprises using the serial number to identify the first aid kit, using the serial number to identify the customer of the first aid kit or entering the customer of the first aid kit into a first database. The requisition system further comprises entering a list of replacement supplies for the first aid kit or designating a pre-established replacement list of supplies for the first aid kit into a second database and automatically generating a communication indicating the supplies of the second database. The system further comprises employing first and second databases to compile a requisition for first aid supplies for the first aid kit.

The system also may comprise using the serial number to generate a selected menu of replacement first aid supplies. The method may also comprise using the serial number to generate a list of first aid supplies that make the first aid kit compliant with contemporary first aid safety standards.

The requisition system also employs electronically compiling an order history and forwarding the order history to a customer. The requisition system also comprises scanning a container for first aid supplies electronically identifying the supply and entering the supply in the second database.

In one embodiment, a customer order history is derived for a given time period and a customer benchmark is calculated. The order history for each division of the customer for a given time period is compiled and each division benchmark of the customer is compared. A customer order history is derived for a given time period and a customer benchmark is calculated for multiple customers.

In one embodiment, the requisition system comprises entering a single input to order a complete set of replacement contents of a selected first aid kit. The single input, in one embodiment, may order all replacement contents required to comply with contemporary standards for a selected first aid kit. In one embodiment, data is entered for an automatic replenishment of supplies. The subscription data is editable to change kits embraced by the subscription, a requisition period and/or a delivery as scheduled. In one embodiment, the requisition system is adapted to automatically transmit a communication to service a safety item in the form of a fire extinguisher, a smoke detector, carbon monoxide detector, an AED or a respirator.

BRIEF DESCRIPTION OF THE DRAWINGS

FIG. 14 is a representative order history report issued by the requisition system FIG. 1

DETAILED DESCRIPTION

Figure 1:
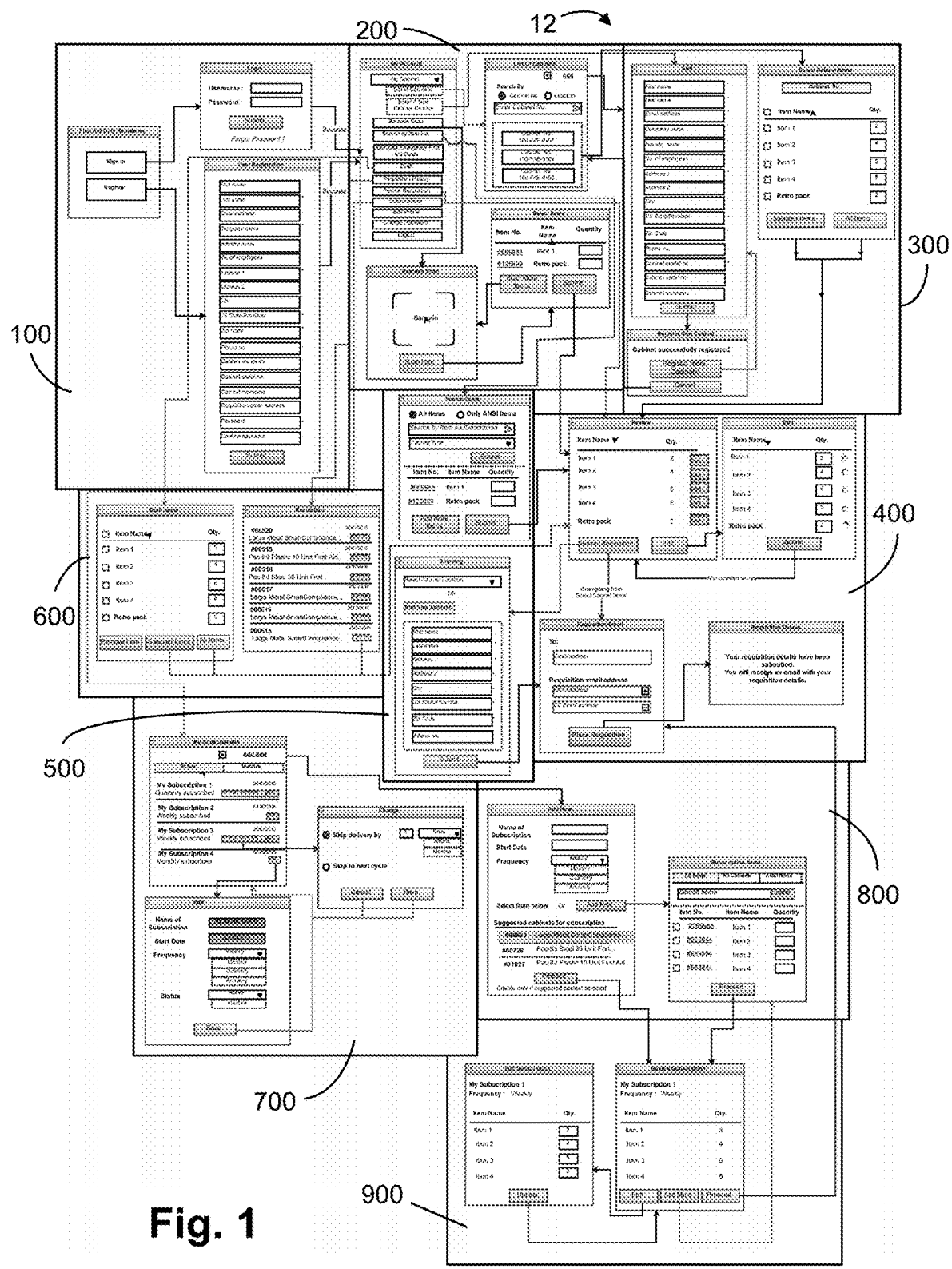
FIG. 1 is a flowchart for a requisition system with automatic replenishment.
Figure 2:
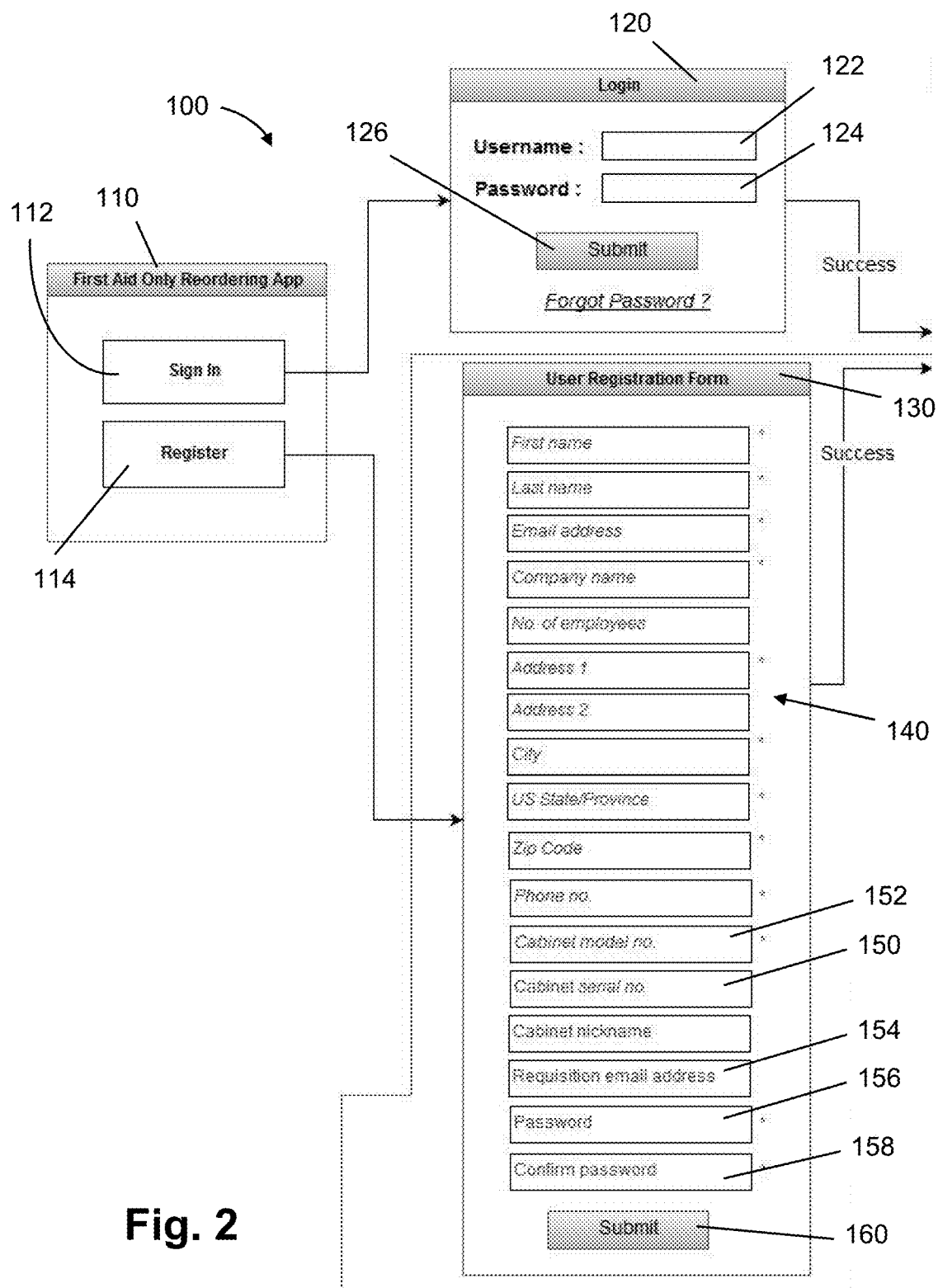
FIGS. 2-10 are enlarged views of portions of the requisition system flowchart of FIG. 1.
Figure 3:
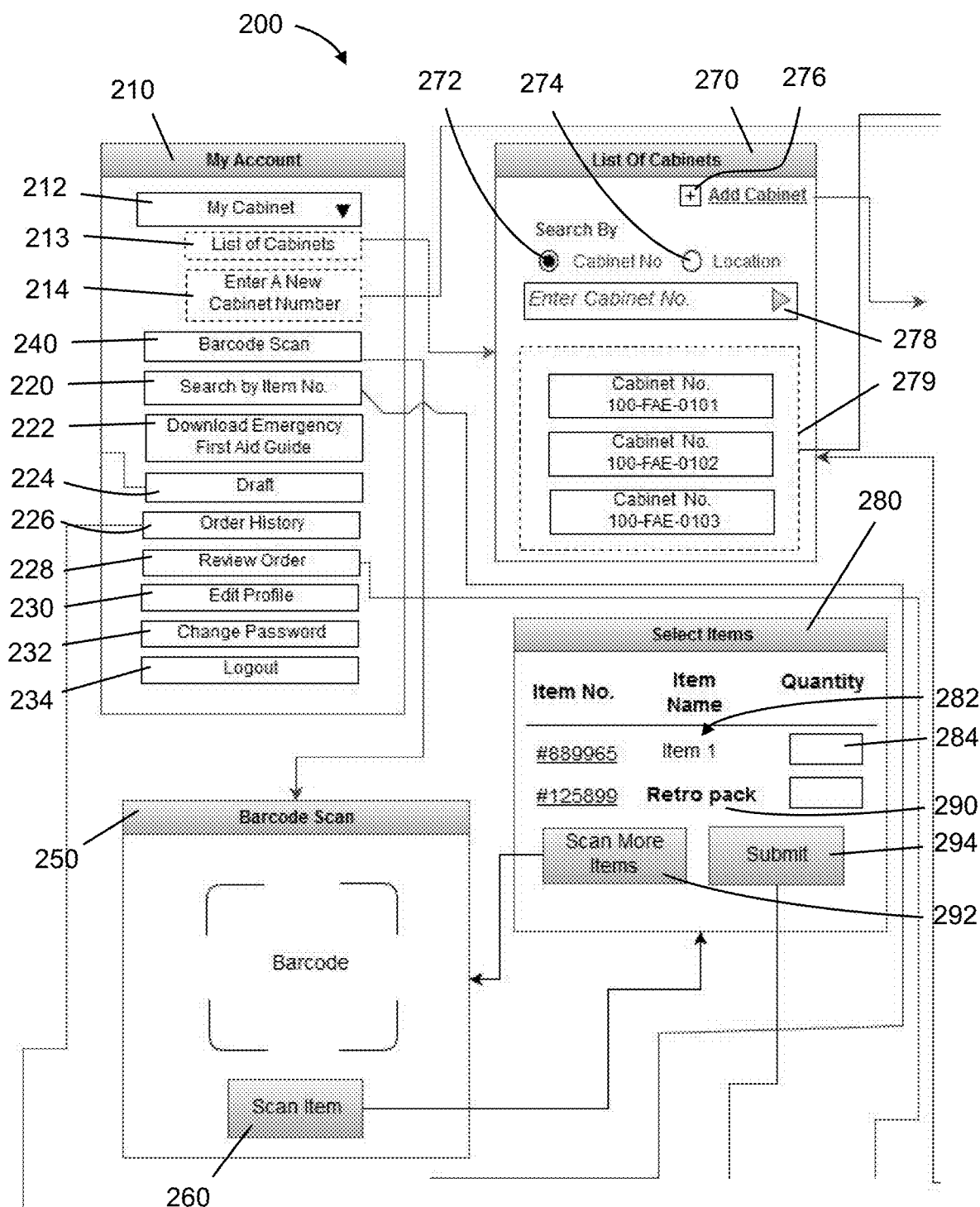

With reference to the drawings wherein like numerals represent like parts throughout the several figures, a requisition system which is specifically adapted for maintaining the component integrity of first aid kits. A flowchart illustrating at least some of the requisition system 10 is generally designated by the numeral 12 in FIG. 1.

The requisition system 10 is configured to employ an app which may be downloaded on various mobile electronic devices 20, 20A, 20B . . . or other computer devices. The requisition system functions to receive an input entered on an electronic device and to communicate with the device. In some instances, the system compiles an order history and provides an efficient means for ensuring that the supplies for a first aid kit are properly replaced and that the American National Standards Institute (ANSI) requirements for a first aid kit are in full compliance. The system automatically generates information for procuring and forwarding the replacement contents for a first aid kit and for compiling requisition reports which are disseminated to the customer or end user of the app.

Figure 11:
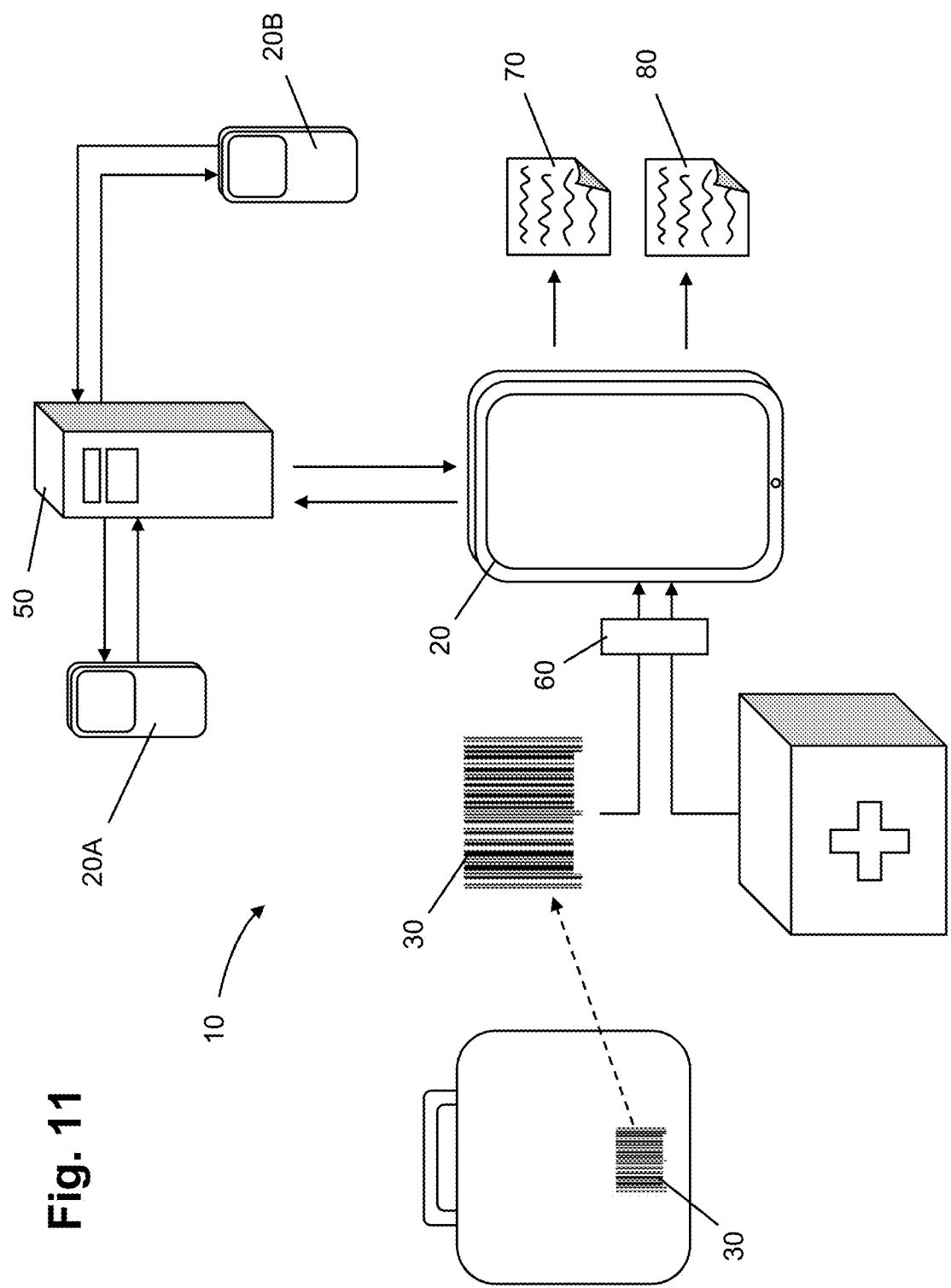
FIG. 11 is a schematic illustration of various aspects of the requisition system.

With reference to FIG. 11, the requisition system 10 is premised on applying a unique serial number 30 (preferably in the form of a barcode) to each first aid kit 40. The unique serial number can ultimately be employed to identify the end user or a customer and possibly the location of the kit, as well as the contents of the kit.

Figure 12:
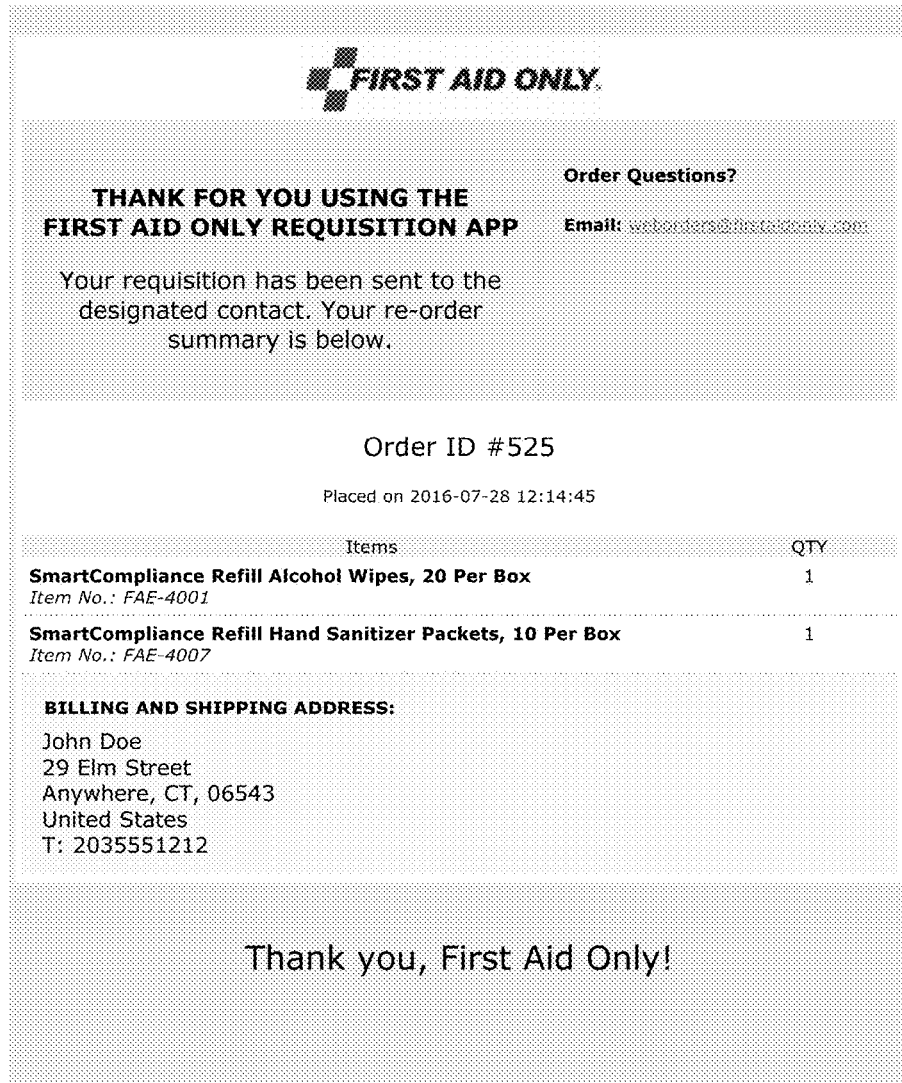
FIG. 12 is an illustration of a representative procurement communication generated by the requisition system.

In one embodiment, the requisition system employs a user-friendly program and compiles multiple databases on a main server 50 and generates apps which are downloadable on various mobile electronic devices 20, 20A, 20B . . . that are employed to provide the user interface input and output features of the requisition system. The user can then activate the various screens on the electronic device to provide, select and input information into the requisition system, including employing a scanner 60 at the electronic device to provide inputs. Communications in the form of notices, reports and commercial documents generated by the requisition system are then transmitted to the electronic device in the form of emails 70 and 80, such as represented in FIGS. 12 and 14.

The flowchart 12 for first aid requisition system 10 has been subdivided into nine inter-related subsystems as designated by the numerals 100, 200, 300, 400, 500, 600, 700, 800 and 900 in FIGS. 2-10. Each of the subsystems includes modules which are further described below. Some of the modules are illustrated with representative data to facilitate the descriptions of the modules.

Subsystem 100 includes a requisition system for first aid kits first aid only reordering module 110 with a sign-in input 112 and a register input 114. The sign-in input 112 communicates with a login module 120 which includes a username input 122 and a password input 124. A submit button 126 is employed so that the successful username/password connects as an input to subsystem 200 which includes a "my account" module 210.

The register input 114 connects with a user registration form module 130. The user form module 130 includes input blocks 140 for first name, last name, email address, company name, number of employees, address 1, address 2, city, U.S. state/province, ZIP code and phone number.

The user registration form module 130 also includes a cabinet serial number input 150 and a cabinet model number input 152. Entry of the cabinet serial number into the serial number input 150 is unique in that it pulls in all the relevant information. Since the requisition system keys on a unique cabinet serial number, the user registration form module also includes a requisition email address input 154, a password input 156 and a confirm password input 158. A submit button 160 is included, and if the submission is successful, it is connected with the "my account" module 210.

The "my account" module 210 includes a "my cabinet" menu 212 which provides a list of cabinets and an entry port 214 for a new cabinet number. The "my account" module 210 also includes a search by item number input button 220 and a download emergency first aid guide button 222. The module 210 also includes an input 224 for a draft of items, an input 226 for an order history, and a button 228 for a review of order. The "my account" module 210 also has an edit profile button 230, a change password input 232 and a logout button 234.

The subsystem 200 also includes a barcode scanner 250 which scans the serial number of the kit and a scan item 260 which scans a barcode or serial number of a specific item. The scanning functions are preferably undertaken on or at the electronic device 20.

The scanner 250 is activated by the barcode scan button 240 of the "my account" module 210. A list of cabinet modules 270 includes an input toggle for searching by cabinet number 272 or location 274, an input 276 to add a cabinet number and an input 278 to enter a cabinet number. Input 278 generates a menu 279 of a specific listing of cabinet numbers which are preferably automatically generated for designation.

Figure 5:
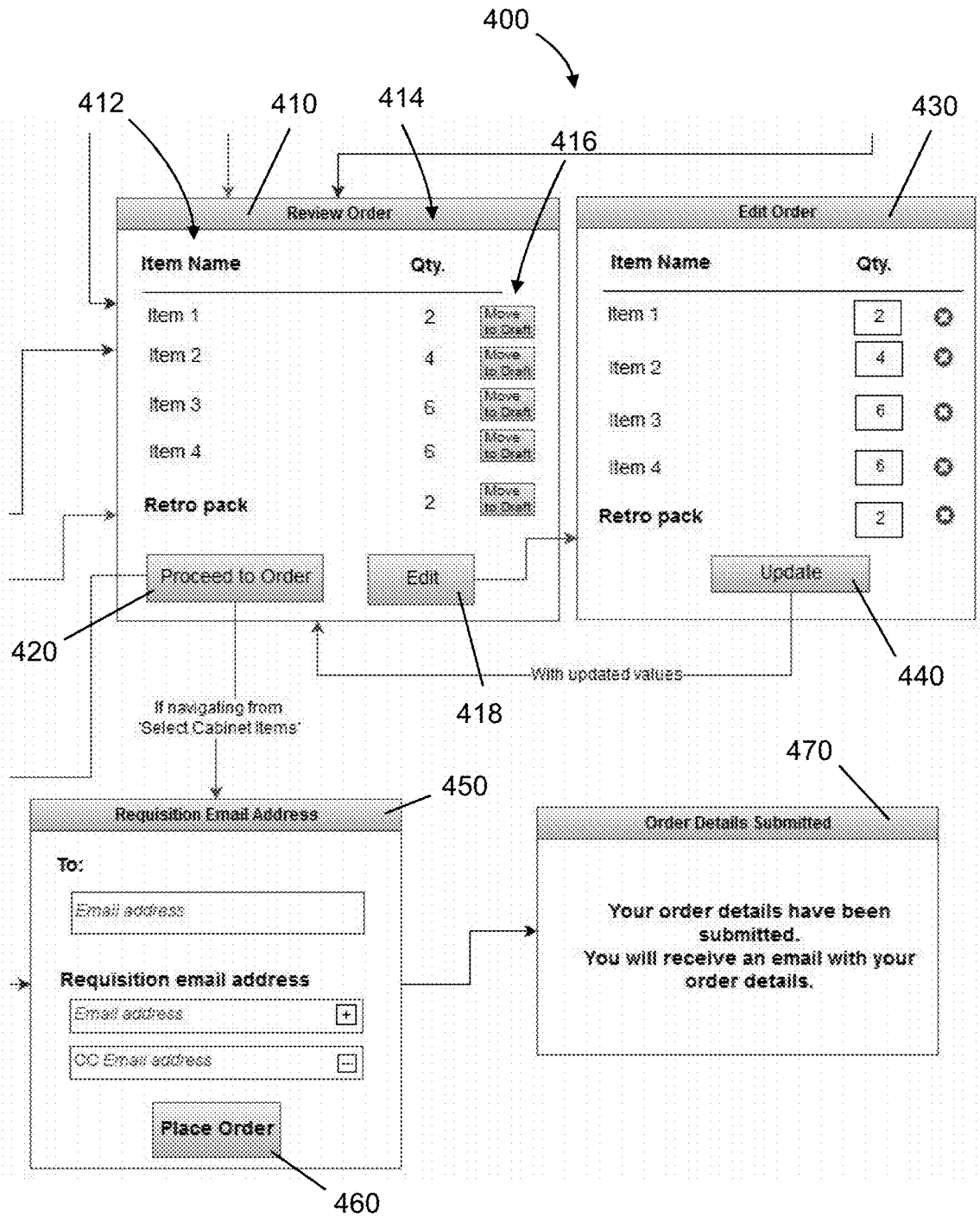

A select item module 280 includes a listing 282 of the item names as input from the scanner 250 and an input box 284 for selectively entering the quantity. The module 280 also includes a retro pack selection module 290 which allows a first aid kit to be updated to a specific time and standard as well as the number of such kits to be so updated. The module 290 also includes an input button 292 to scan more items which returns to the scanner 250, or a "submit item" button 294 which generates an output to review order module 410 of subsystem 400 (FIG. 5).

Figure 4:
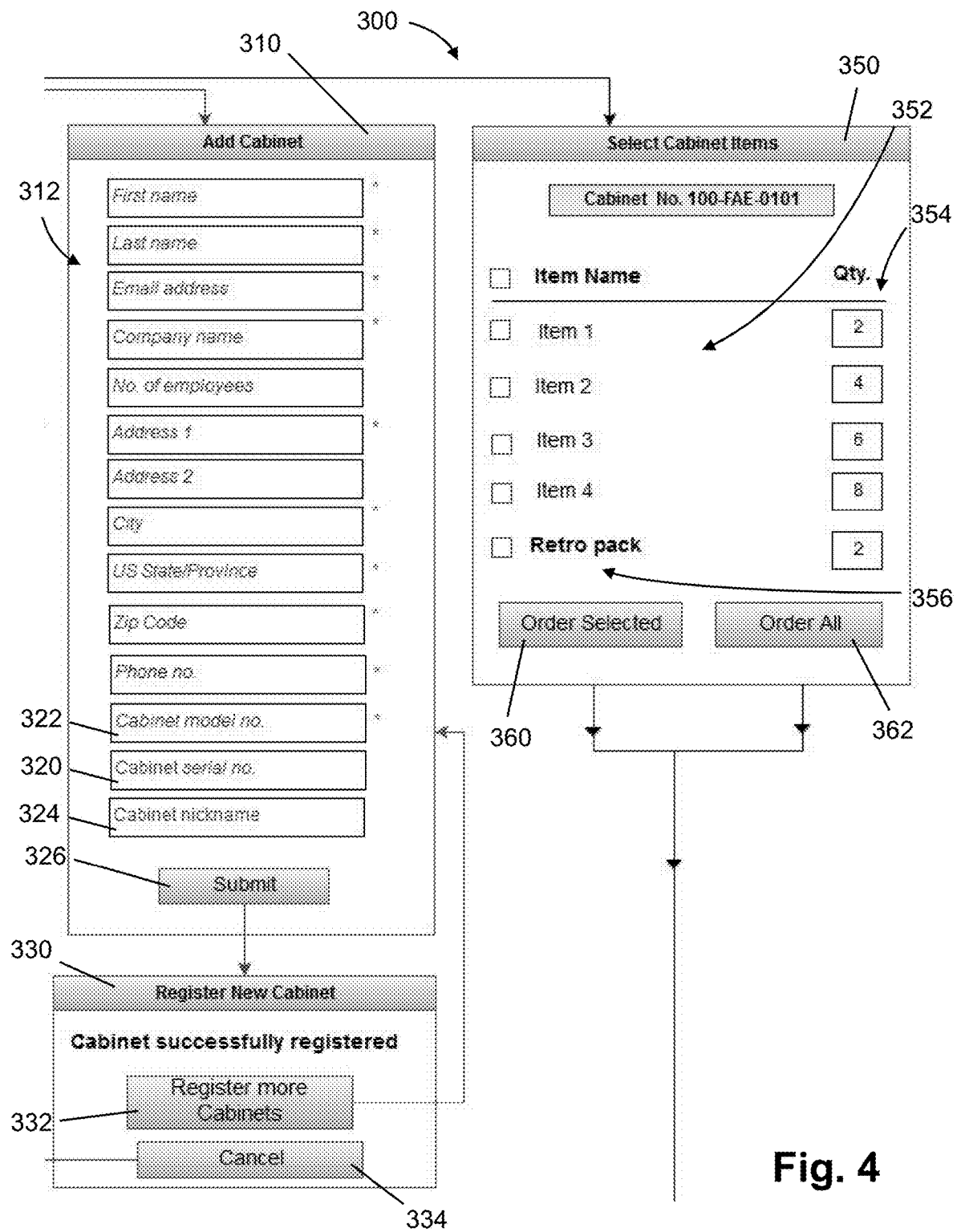

With reference to FIG. 4, subsystem 300 comprises an "add cabinet" module 310 which communicates with a register new cabinet module 330. The "add cabinet" module 310 has input boxes 312 for entering a first name, last name, email address, company name, number of employees, address 1, address 2, city, state/province, ZIP code and phone number. The module 310 also includes a box for entering a cabinet serial number 320, a cabinet model number 322 and a cabinet nickname 324. Once sufficient information is entered, a "submit" button 326 may be actuated for communicating with the register new cabinet module 330.

Register new cabinet module 330 includes a button 332 to register more cabinets which returns to the "add cabinet" module 310. The register new cabinet module 330 also contains a cancel button 334. Successfully registered cabinet data is then communicated to the list of cabinets module 270 and subsystem 200.

Subsystem 300 also includes a select cabinet items module 350 which generates the various cabinets 352 from the list of cabinets and lists the various items with boxes 354 for entering the required quantities (representative quantities are shown). Input boxes 356 also provide a retro pack selection to comply with ANSI requirements. The module includes an order select button 360 or an order all button 362, each of which buttons provide input to a review order module 410 of subsystem 400. A single button may be actuated to order a complete set of replacement items for a kit. A single button may be actuated to order all supplies required to meet contemporary compliance standards, for example, the ANSI standard.

Subsystem 400 includes a review order module 410 and an edit order module 430 which may ultimately communicate with a requisition email address module 450 and an order details submission module 470.

The review order module 410 displays the various items 412 and the selected quantity 414 (representative quantities are shown). A move to draft button 416 is provided to transfer a specific item to the draft. If everything is correct, a "proceed to order" button 420 is provided which communicates with the requisition email address module 450 which includes a place order button 460. The requisition email address module 450 communicates with the order details submitted module 470 which generates a message indicating that the customer will receive an email with the order details.

If at the review order module 410, changes are required, an edit button 418 is pushed and communication is established with the edit order module 430 which allows for the various quantities to be changed. The edit order module 430 provides an update button 440 which communicates back to the review order module 410, and the order is again reviewed and either a "proceed to order" button 420 or an edit button 418 is activated.

Figure 6:
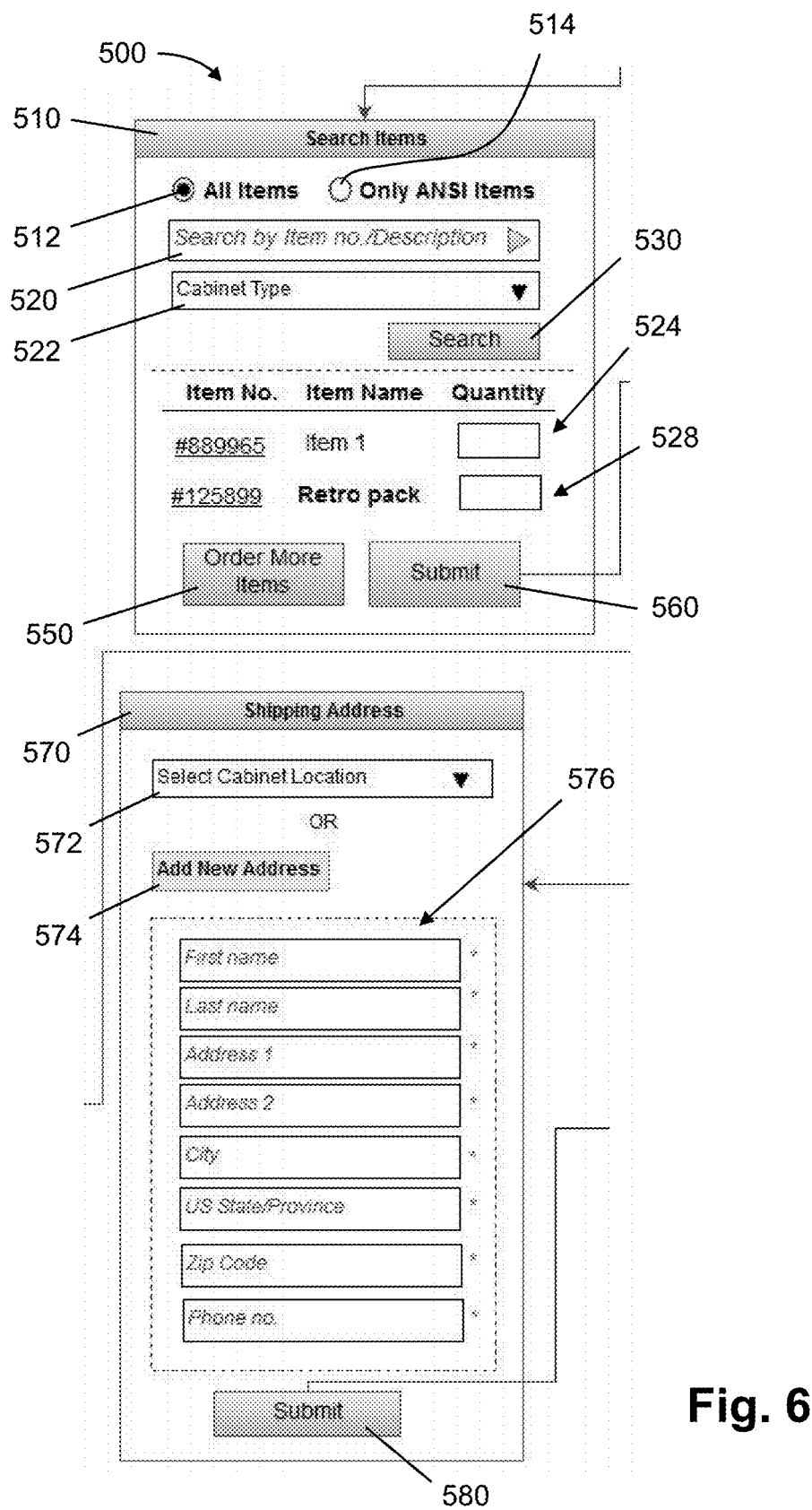

With reference to FIG. 6, subsystem 500 comprises a search items module 510 and a shipping address module 570. The search items module 510 receives data from the search by item input port of the "my account" module 210. The search items module 510 includes a toggle switch which indicates all items 512 or only ANSI items 514. The search items module 510 includes a search by item number description menu 520 and a menu input 522 to bring down and indicate the cabinet type. A search button 530 then actuates the selected searching which provides a list 524 than identifies the item number, the item name and provides a box for indicating the quantity. In addition, a retro pack item inbox 528 is also provided. The search items module then includes an order more items button 550 and a submit button 560 which transfers the data to the review order module 410.

The shipping address module 570 includes a select cabinet location bring down menu 572 or an "add new address" button 574. Button 574 generates boxes 576 for entering the first name, last name, address 1, address 2, city, U.S. state/province, ZIP code and phone number. A submit button 580 submits the data to the requisition email address module 450.

Figure 7:
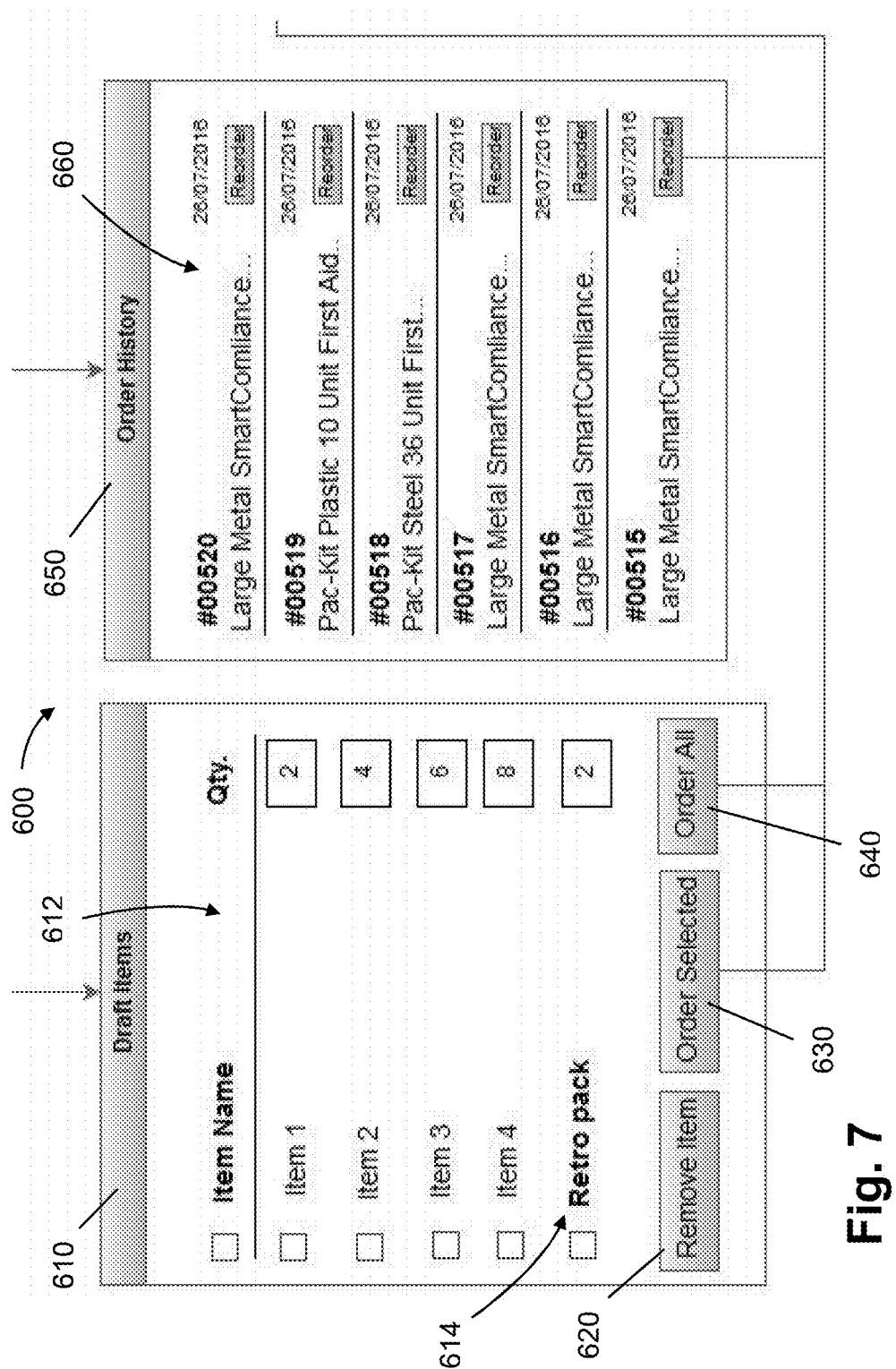

With reference to FIG. 7, subsystem 600 includes a draft items module 610 and an order history module 650. The draft items module 610 receives data and information from the draft output of the "my account" module 210. The draft items module 610 includes a list 612 of item names and quantity as well as a retro pack selection 614 (representative quantities are shown). A remove button 620 is provided to remove an item and a button 630 is provided to order selected items. Another button 640 can be activated to order all items.

The information is then transferred to the order history module 650 which lists the various first aid kits and historical information concerning the reordering of the kits. The latter information is then transferred to the review order module 410 for review and/or editing 430 and ultimately to the place order button 420.

Figure 13:
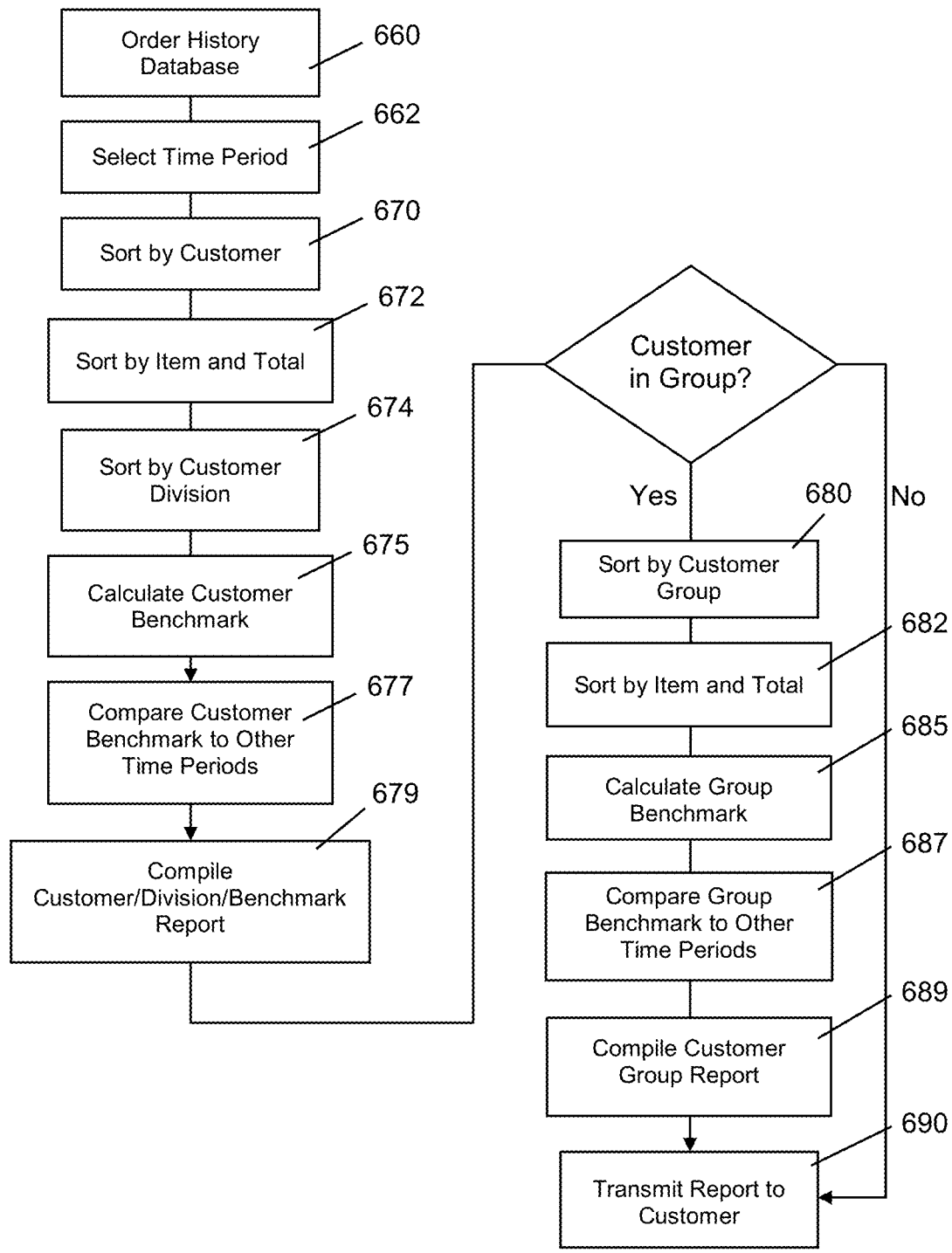
FIG. 13 is a flowchart illustrating various features of the order history for the requisition system of FIG. 1.

With reference to FIG. 13, the order history module 650 compiles an order history database 660 which includes a list of items ordered, the date of the order, the date of the shipment, the customer, the location or division of the customer for which the order is tended and identifying information concerning the customer including the industry or technology group associated with the customer. A time period is selected at 662 and the information in the database is sorted by customer at 670. Information for each item order is then sorted and totaled for time period at 672. The information within the customer by division and/or location is also sorted at 674. A customer benchmark is then calculated at 675. The benchmark provides a weighted average of items ordered for the given time period for the customer. The customer benchmark is compared to benchmarks for previous periods (if available at 677).

A customer division benchmark report is then compiled at 679 and transmitted to the customer at 690.

Where applicable, the database information is also sorted by customer group or industry at 680. The group items are sorted and totaled at 682. A group benchmark is then calculated at 685. The group benchmark is compared to other benchmarks for other time periods at 687. A customer group benchmark report is compiled at 689. The reports are then transmitted to the customer at 690 so that the customer can easily view the items purchased for a given time period, compare the items to a previous historic time period and allow for the customer to view how the various divisions compare in relation to the entire customer. In addition, the reports allow the customer to compare its procurement of replacement items to other customers in the group.

An automatic replenishment feature is principally provided by subsystems 700, 800 and 900 which key into user subscriptions that embrace various kits or cabinets and items and allow for selections of automatic delivery dates and other options.

Subsystem 700 comprises a "my subscription" module 710 which is activated from the "my account" module 210. The "my subscription" module includes a button 712 for adding a new subscription and, upon activation, connects with an "add new" module 810 of subsystem 800.

Figure 8:
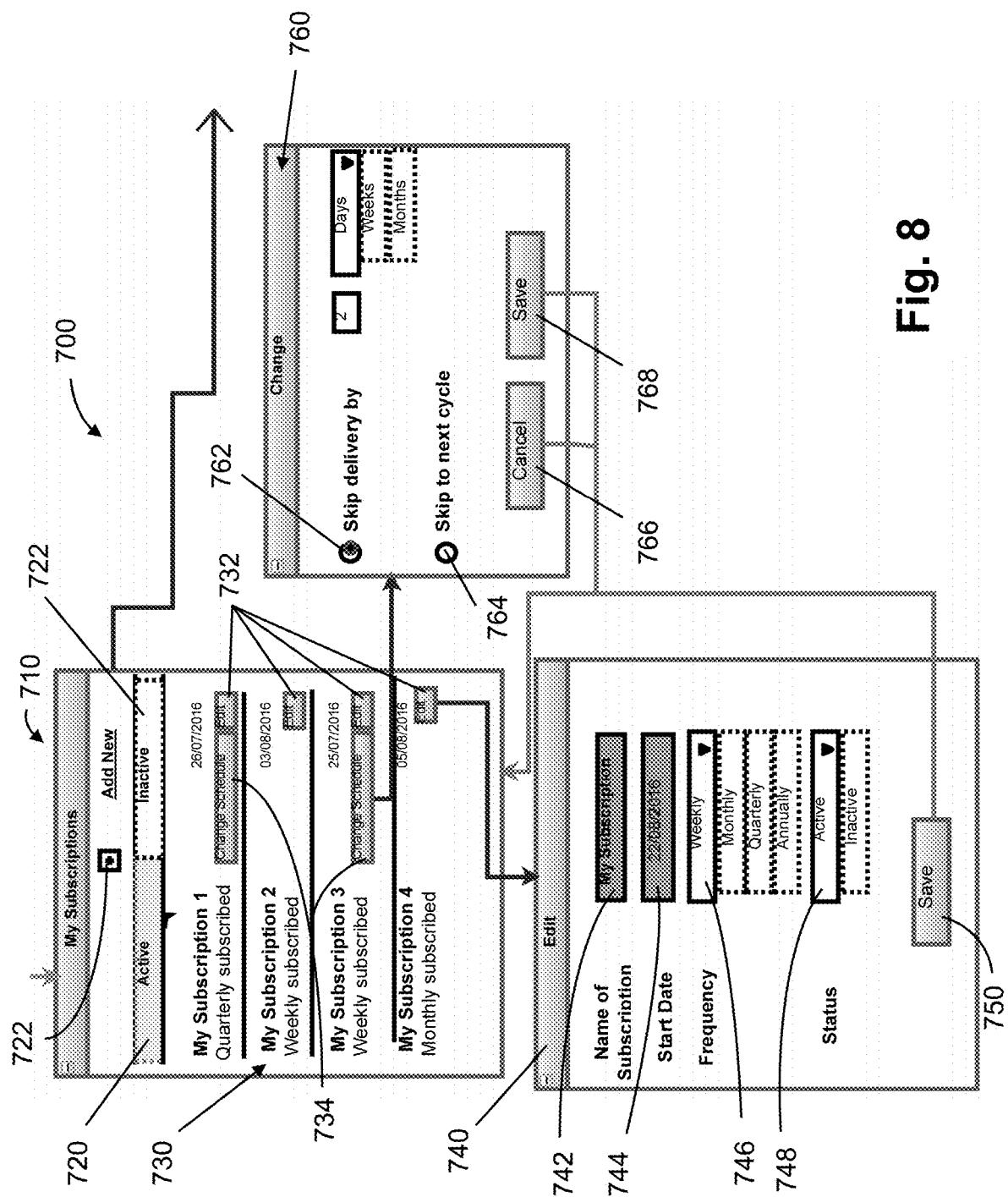
Figure 9:
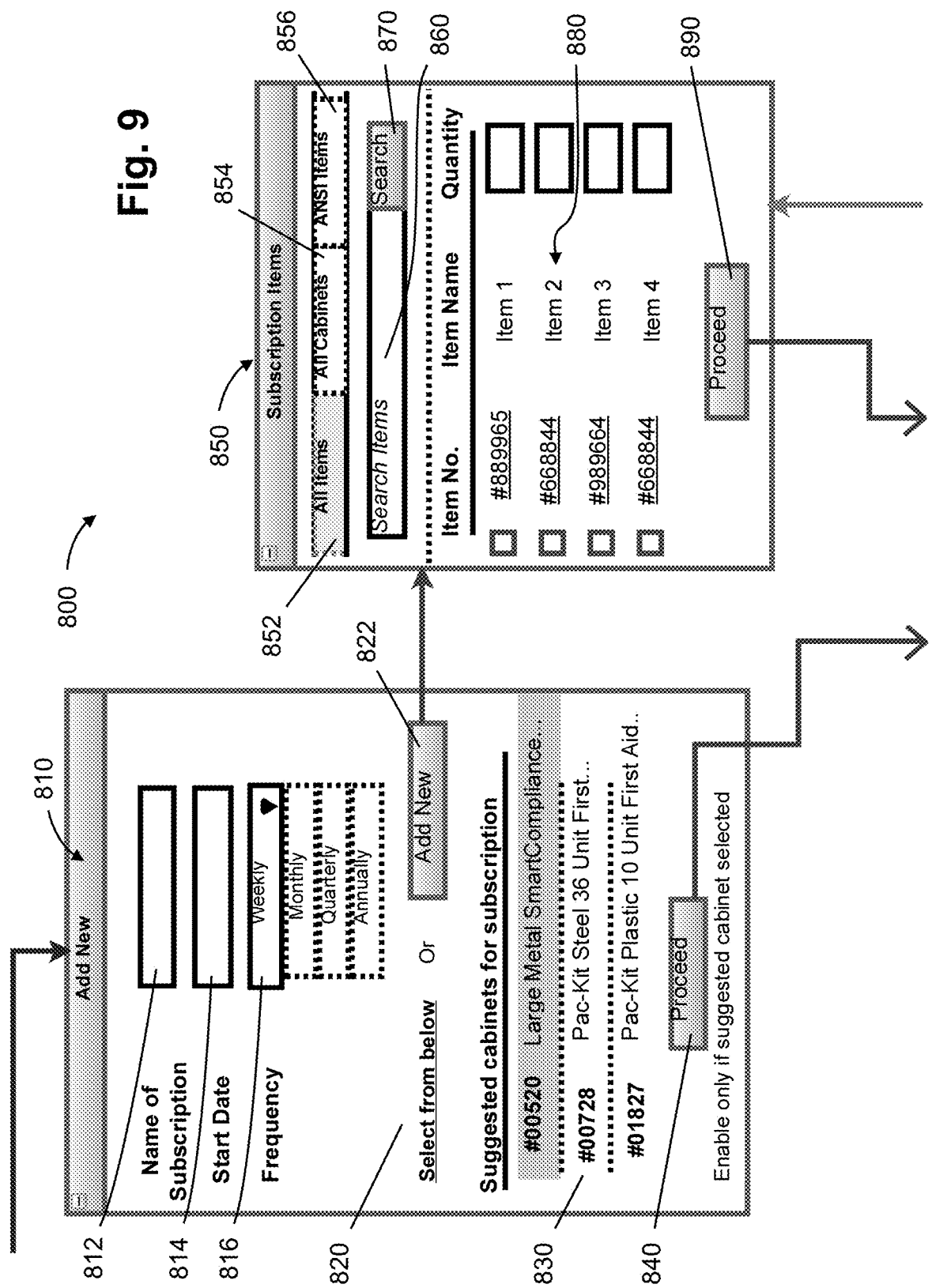
Figure 10:
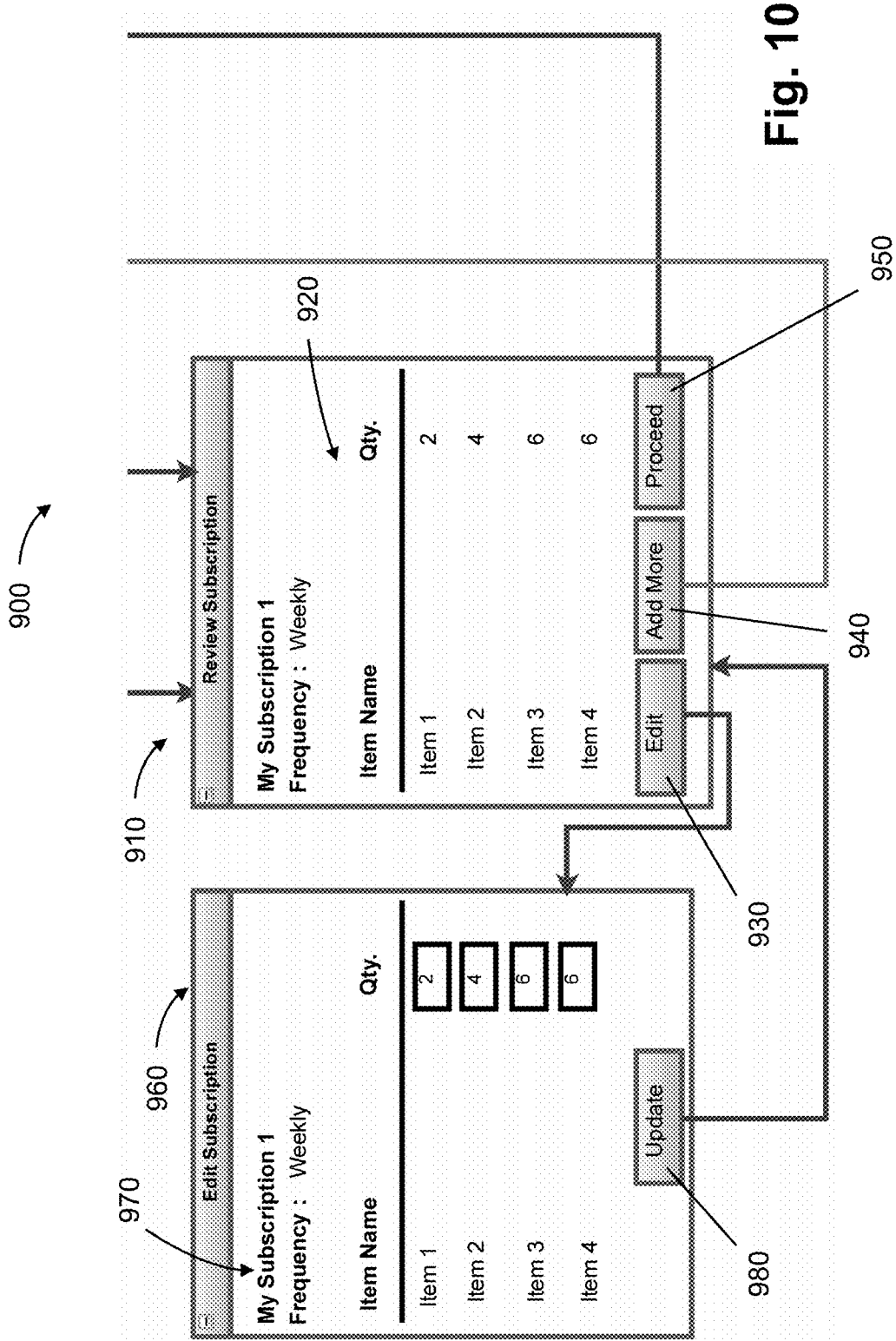

Module 710 includes an active menu button 720 for generating a list of subscriptions 730 and corresponding edit buttons 732 for changing the nature of the subscription such as, for example, quarterly, weekly, monthly, etc. "Change schedule" buttons 734 are also provided to allow for schedule changes. An inactive button 722 changes the subscription to inactive status. Representative subscriptions and dates are indicated in FIG. 8 for the "my subscription" module 710 in which the active status button has been activated.

The edit buttons 732 activate a connection, with an edit module 740. The edit module generates windows 742, 744, 746 and 748 for the name of the subscription, the start date, to change the frequency and the status to be designated as either active or inactive, respectively. Upon completion of the editing, a save button 750 returns to the "my subscription" module.

A change module 760 activated by "change schedule" button 734 allows for the subscriber to skip delivery by an entry at selection button 762 and to skip to a next cycle by a selection at button 764. A cancel button 766 or a save button 768 returns no information or the selected information, respectively, to the "my subscription" module 710.

The "add new subscription" button 712 provides an input to the "add new" module 810 of subsystem 800. Windows 812, 814 and 816 are provided as inputs for the new subscription. A "menu selection" button 820 and an "add new" button 822 facilitates usage. The menu selection button 820 generates a menu of suggested first aid cabinets or kits for subscription as indicated by the list 830 with represented cabinets indicated in the illustrated subsystem 800. Once a cabinet is selected, a "proceed" button 840 generates an output to subsystem 900.

The "add new" button 822 generates an output to a "subscription items" module 850 which includes selection buttons 852 for "all items", 854 for "all cabinets" and 856 for "ANSI" items. A search input box 860 and a search button 870 are employed to generate searchable items and provide a listing, such as 880 indicated in "subscription items" module 850. The latter provides for individual items to be subject to automatic replenishment. At the conclusion, a "proceed" button 890 is provided to generate an output to subsystem 900. It will be appreciated that representative items with quantity input screens are indicated in "subscription items" module 850.

The outputs from subsystem 800 are communicated to a "review subscription" module 910 of subsystem 900. The subscriptions are serially generated on a screen at 920. A representative subscription is illustrated at screen 920. An edit button 930, an "add more" button 940 and a "proceed" button 950 are provided. The "add more" button 940 and the "proceed" button 950 provide return inputs to "subscription items" module 850 and "requisition email" module 450, respectively.

The output from actuating edit button 930 is communicated back to the "edit subscription" module 960 where the subscription is displayed on screen 970 and may be further edited and, upon activating update button 980, returned to the "review subscription" module 910.

Figure 15:
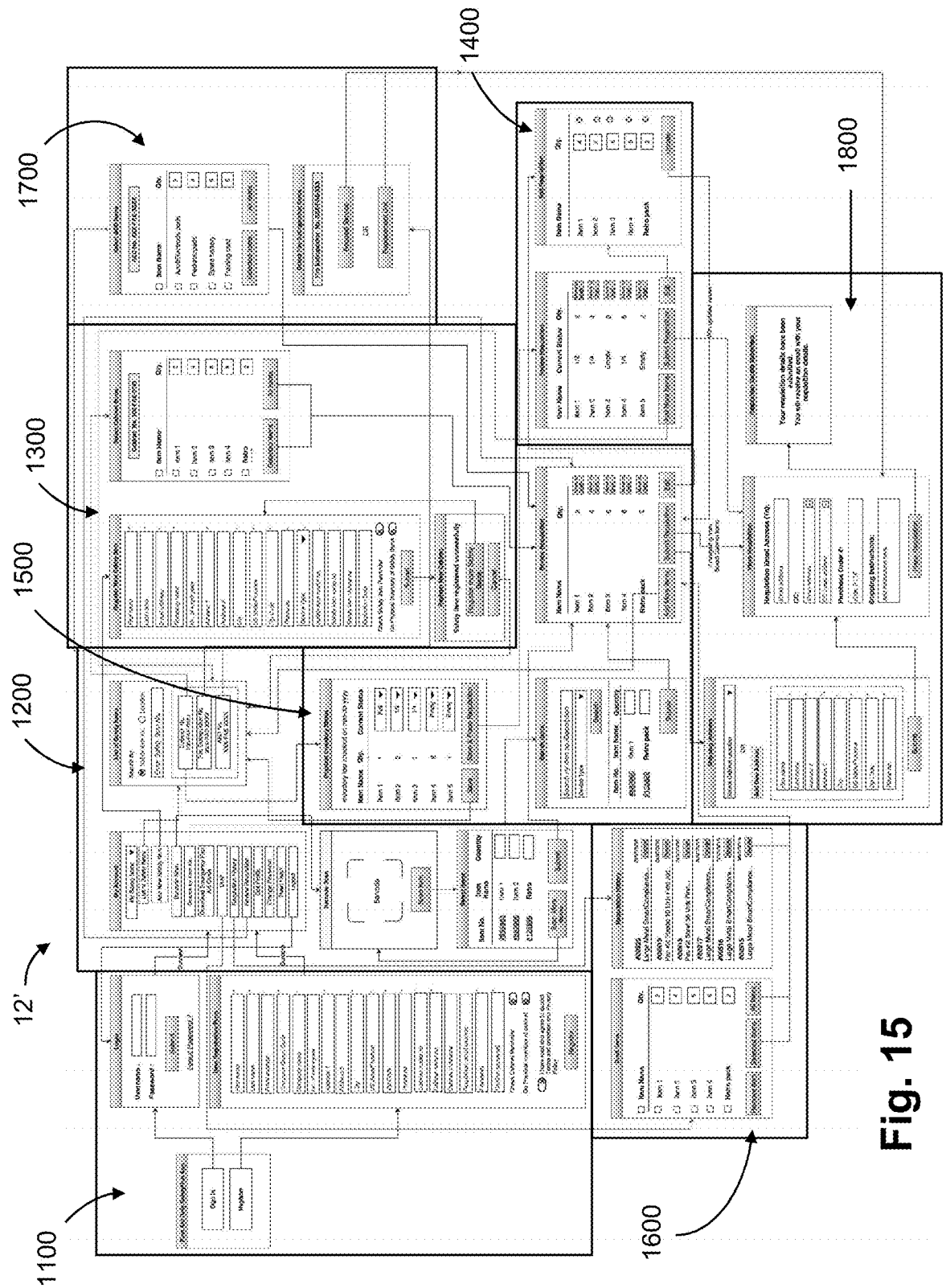
FIG. 15 is a flowchart for a second embodiment of a requisition system for multiple safety items with inventory monitoring.
Figure 16:
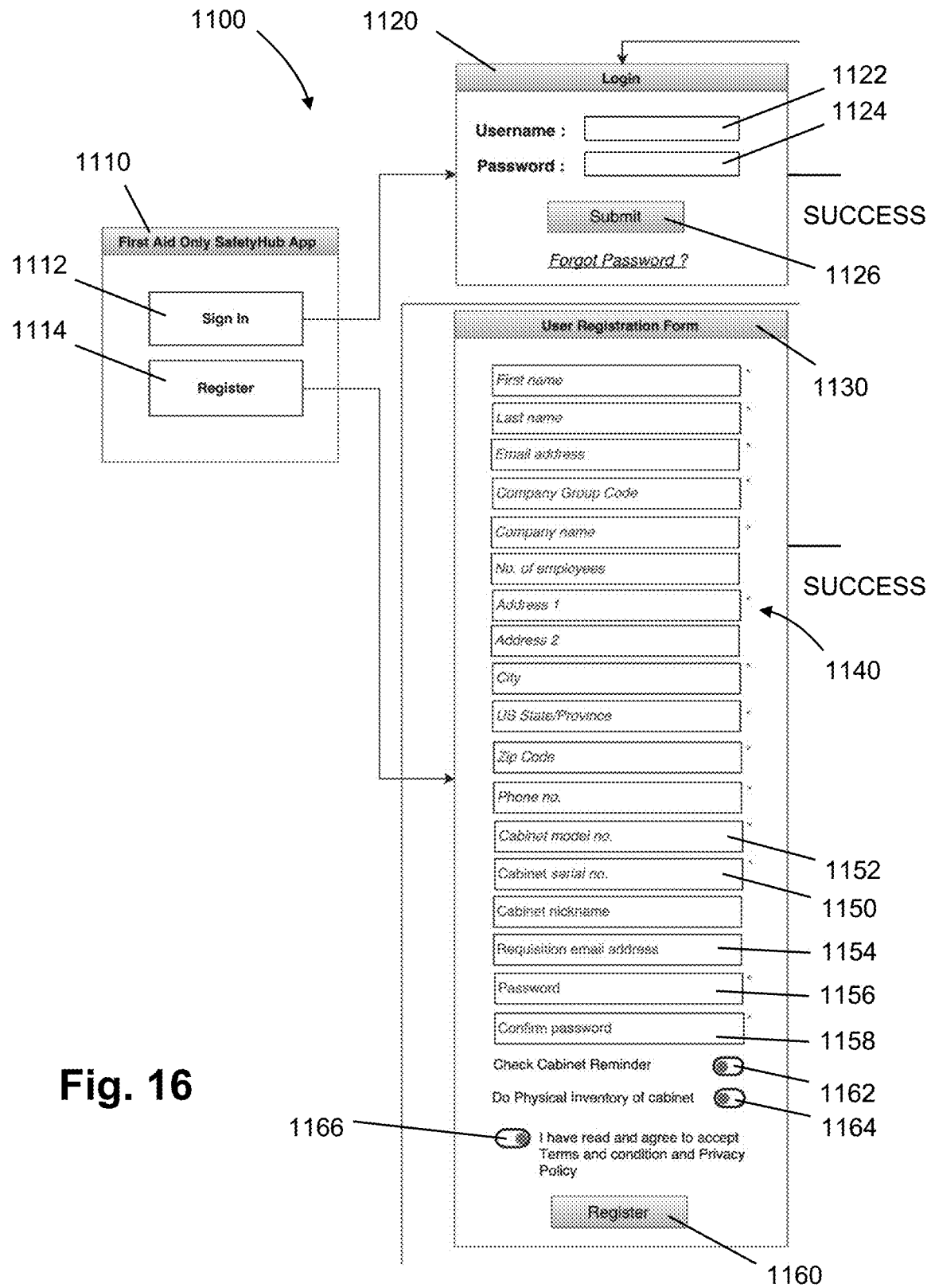
FIGS. 16-23 are enlarged views of portions of the requisition system flowchart of FIG. 15.
Figure 24:
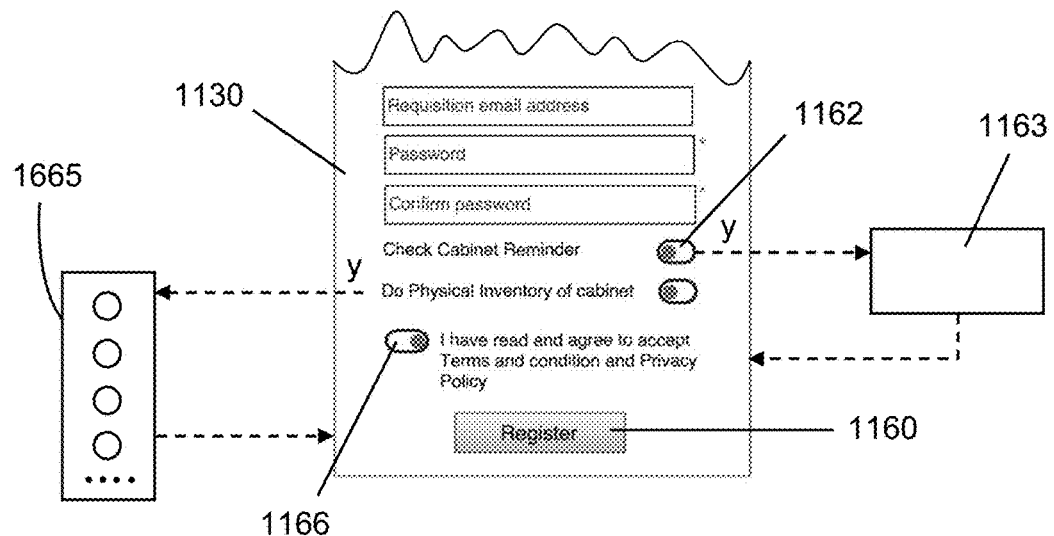
FIG. 24 is an enlarged portion, partly in schematic, of the subsystem of FIG. 16.
Figure 25:
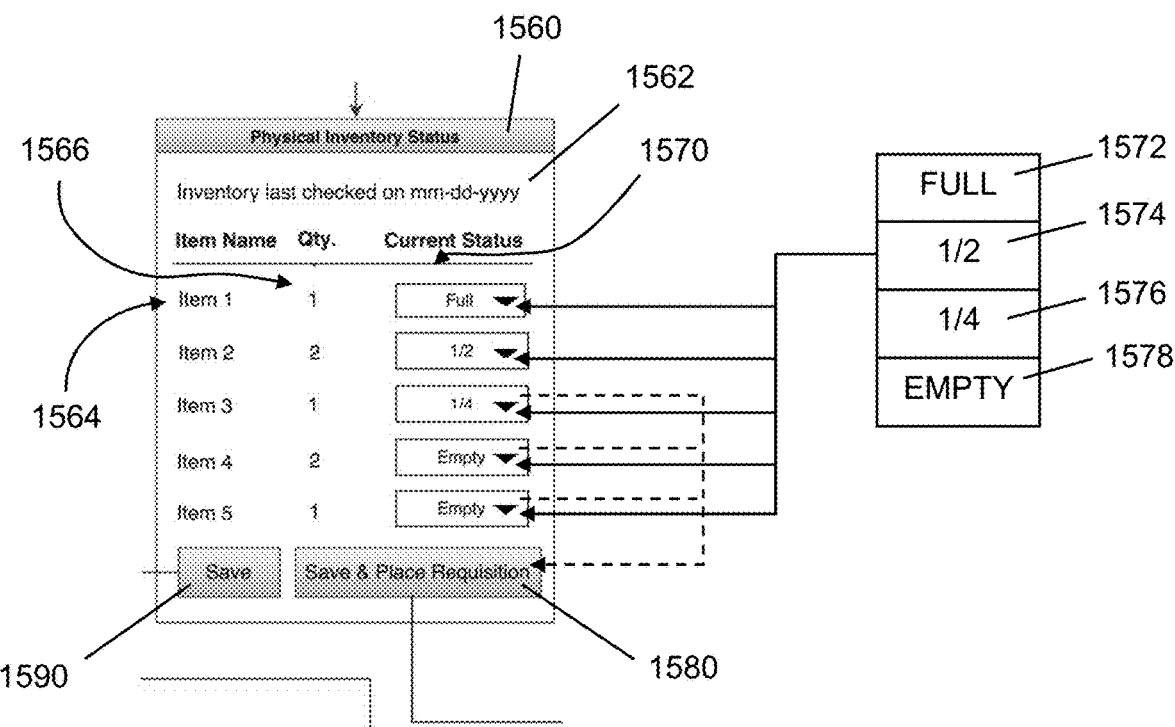
FIG. 25 is a schematic interactive screen which is employable with the requisition system illustrated in FIG. 15.

A more comprehensive safety requisition system 10' for multiple safety items which is adaptable for additional safety items, such as blood borne pathogen kits, eyewash stations, fire extinguishers, automated external defibrillator, smoke detectors, carbon monoxide detectors, respirators and filters and additional miscellaneous safety items, and has a multifaceted instant inventory capability and notification is described by flowchart 12' in FIG. 15. The flowchart 12' for requisition system 10 has been subdivided into eight interrelated subsystems as designated by the numerals 1100, 1200, 1300, 1400, 1500, 1600, 1700 and 1800 in FIGS. 16-23. Each of the subsystems includes modules which are further described below. Some of the modules are illustrated with representative data to facilitate the description of the modules. Additional specific features are illustrated in FIGS. 24 and 25. Requisition system 10' is also configured to employ a downloadable app on a mobile electronic device or a computer device.

Subsystem 1100 (FIG. 16) includes a first aid only reordering module 110 with a sign-in input 1112 and a register input 1114. The sign-in input 1112 communicates with a login module 1120 which includes a username input 1122 and a password input 1124. A submit button 1126 is employed so that the successful username/password connects as an input to subsystem 1200 which includes a "my account" module 1210.

The register input 1114 connects with a user registration form module 1130. The user form module 1130 includes input blocks 1140 for first name, last name, email address, company name, number of employees, address 1, address 2, city, U.S. state/province, ZIP code and phone number.

The user registration form module 1130 also includes a cabinet serial number input 1150 and a cabinet model number input 1152. Entry of the cabinet serial number into the serial number input 1150 is unique in that it pulls in all the relevant information. Since the requisition system keys on a unique cabinet serial number, the user registration form module also includes a requisition email address input 1154, a password input 1156 and a confirm password input 1158.

With additional reference to FIG. 24, three application user selection bi-stable toggles are provided. Toggle 1162 affords the user an opportunity to receive an automatic alert or a reminder to check the cabinet or safety item. If the user checks yes, a drop down box 1163 allows the user to enter the number of days in advance of the pre-established date for checking the inventory of a given cabinet or safety item. The pre-established data may be the earliest expiration date of a supply, may be set upon registration of the safety item, or may be a required safety item maintenance date. On the advance date, the user receives the reminder alert.

Toggle 1164 selects whether or not the user elects do an automatic physical inventory of the cabinet. If the answer is yes, a notification alert 1165 button is activated to undertake an inventory for each safety item (FIG. 24).

Toggle 1166 indicates whether the user has read and agreed to accept terms and conditions and privacy policy. A submit or register button 1160 is included, and if the submission is successful, it is connected with the "my account" module 1210.

The "my account" module 1210 of subsystem 1200 includes a "my safety items" menu 1212 which provides a list of safety items 1213 and an entry port 1214 for new safety items. The "my account" module 1210 also includes a search by item number input button 1220 and a download emergency first aid guide button 1222. The module 1210 also includes an input 1224 for a draft of items, an input 1226 for requisition history, and a button 1228 for a review of the requisition. The "my account" module 1210 also has an edit profile button 1230, a change password input 1232, a help button 1233 and a logout button 1234.

The subsystem 1200 also includes a barcode scanner 1250 which scans the serial number of the kit and a scan item button 1260 which scans a barcode or serial number of a specific item. The scanning functions are preferably undertaken on or at the electronic device 20.

The scanner 1250 is activated by the barcode scan button 1240 of the "my account" module 1210.

A list of safety items module 1270 includes an input toggle for searching by safety item number 1272 or location 1274 and an input 1278 to enter a cabinet number. Input 1278 generates a menu 1279 of a specific listing of safety item numbers which are preferably automatically generated for designation.

Figure 19:
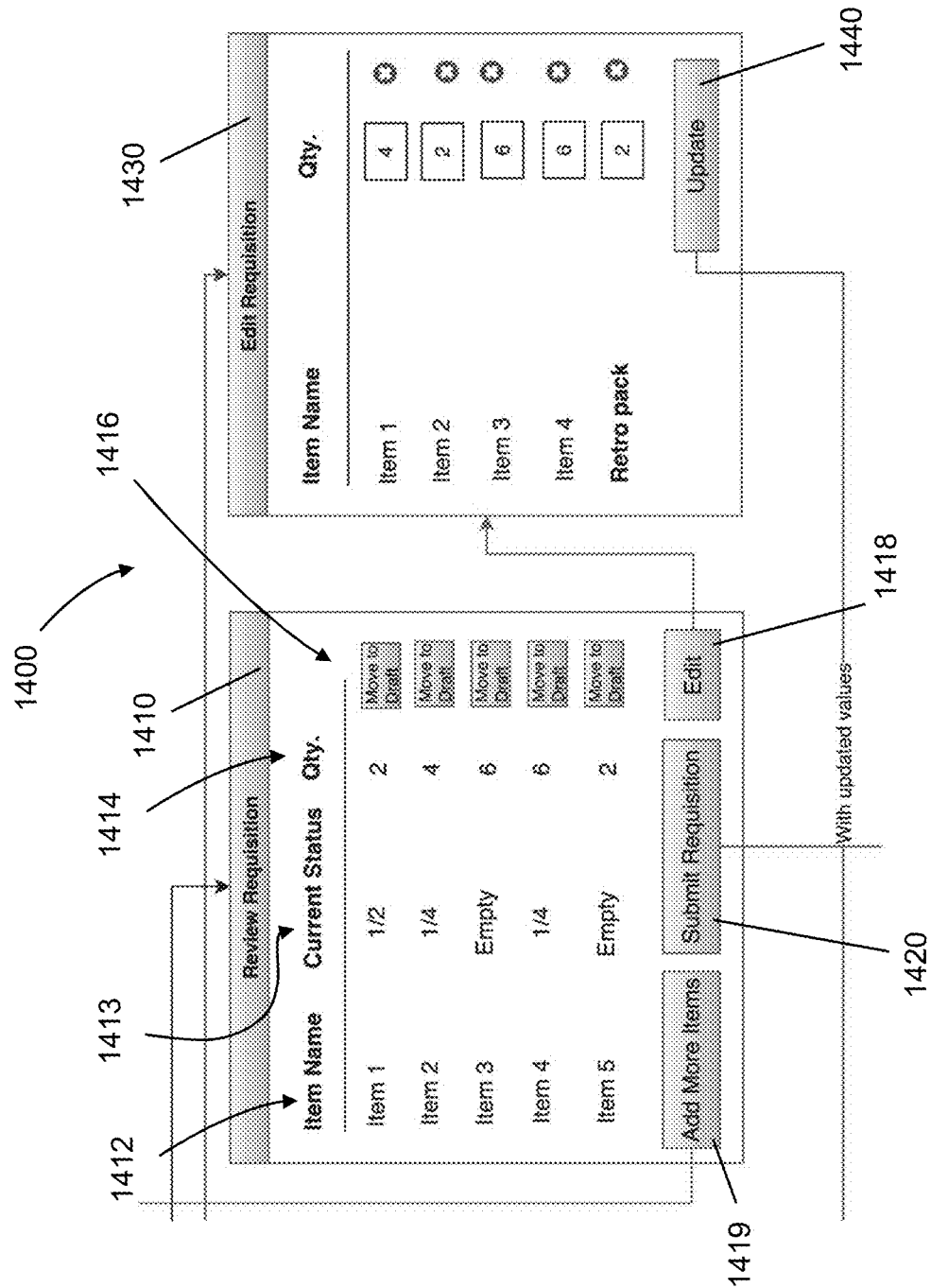

A select item module 1280 includes a listing 1282 of the item names as input from the scanner 1250 and an input box 1284 for selectively entering the quantity. The module 1280 also includes a retro pack selection module 1290 which allows a first aid kit or safety item to be updated to a specific time and standard as well as the number of such kits to be so updated. The module 1290 also includes an input button 1292 to scan more items which returns to the scanner 1250, or a "submit item" button 1294 which generates an output to review requisition module 1410 of subsystem 1400 (FIG. 19).

Figure 18:
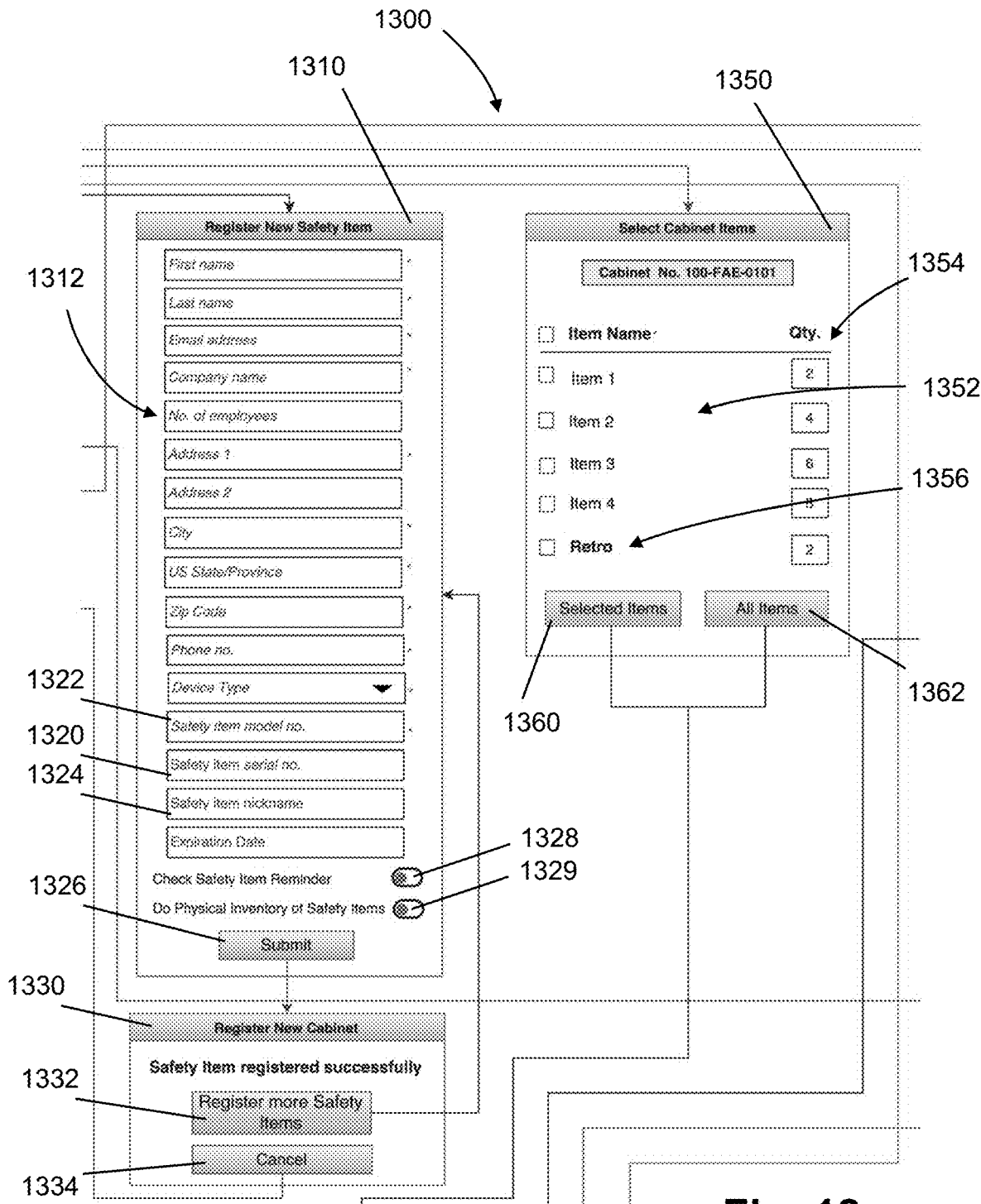

With reference to FIG. 18, subsystem 1300 comprises a "register new safety item" module 1310 which communicates with a register new cabinet module 1330. The "safety registration" module 1310 has input boxes 1312 for entering a first name, last name, email address, company name, number of employees, address 1, address 2, city, state/province, ZIP code and phone number. The module 1310 also includes a box for entering a safety serial number 1320, a safety item model number 1322 and a safety item nickname 1324. The application user activates bi-stable toggle 1328 to indicate whether or not a safety item reminder is automatically issued and bi-stable toggle 1339 to automatically document physical inventory of safety items. Once sufficient information is entered, a "submit" button 1326 may be actuated for communicating with the register new cabinet module 1330.

Register new cabinet module 1330 includes a button 1332 to register more cabinets which returns to the "add cabinet" module 1310. The register new safety item module 1330 also contains a cancel button 1334. Successfully registered safety item data is then communicated to the list of safety item modules 1270 and subsystem 1200.

Subsystem 1300 also includes a select cabinet items module 1350 which generates the various cabinets 1352 from the list of cabinets and lists the various items with boxes 1354 for entering the required quantities (representative quantities are shown). Input boxes 1356 also provide a retro pack selection to comply with ANSI requirements. The module includes an order select button 1360 or an order all button 1362, each of which buttons provide input to a review order module 1410 of subsystem 1400 (FIG. 19). A single button may be actuated to order a complete set of replacement items for a kit. A single button may be actuated to order all supplies required to meet contemporary compliance standards, for example, the ANSI standard.

Figure 23:
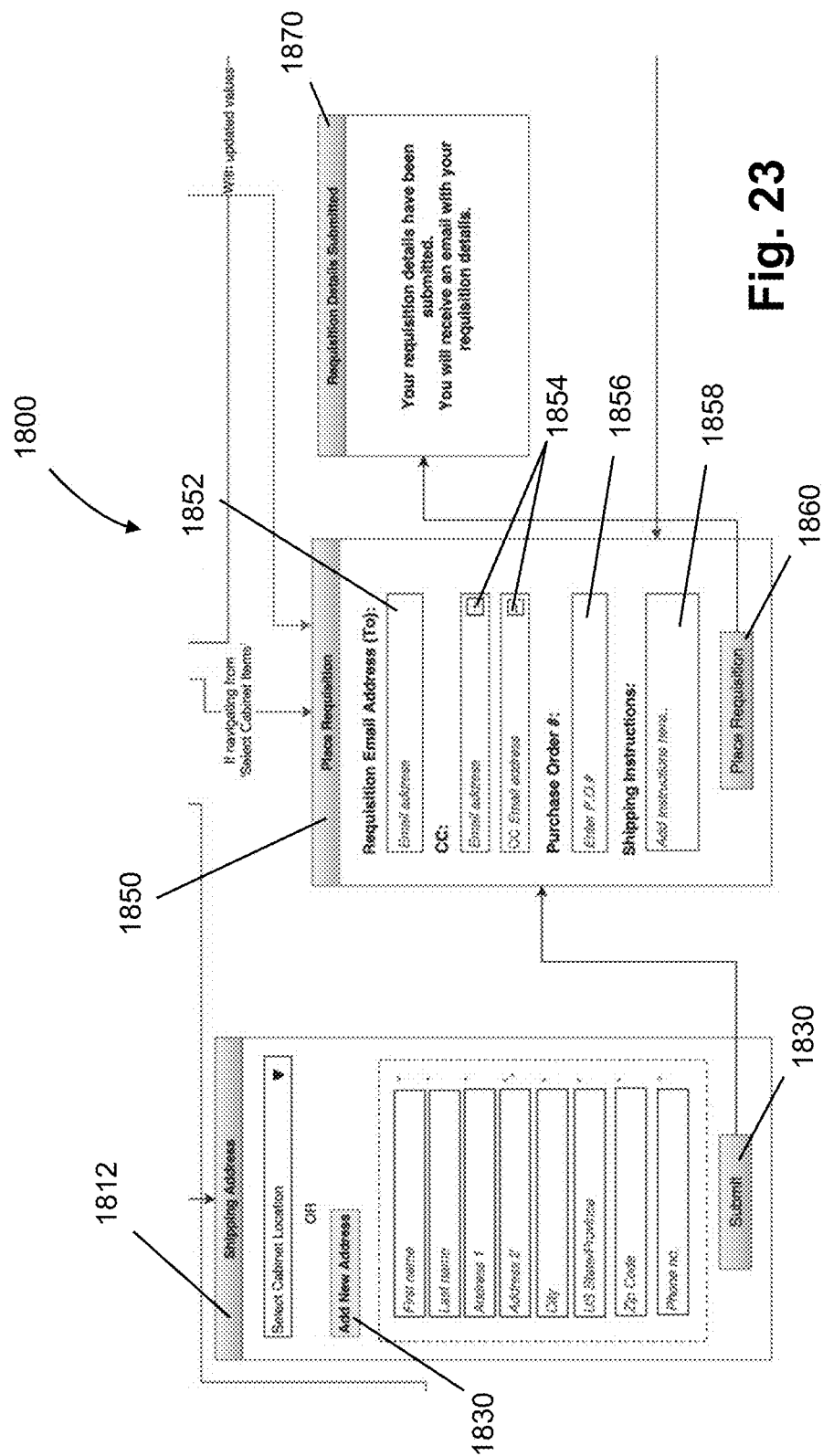

Subsystem 1400 includes a review requisition module 1410 and an edit requisition module 1430 which may ultimately communicate with a requisition email address module 1850 and an order details submission module 1870 (FIG. 23).

The review requisition module 1410 displays the various items 1412. The current inventory status 1413 (representative inventories are shown) and the corresponding quantity 1414 (representative quantities are shown). A move to draft button 1416 is provided to transfer a specific item to the draft. If everything is correct, a "submit requisition" button 1420 is provided which communicates with the requisition email address module 1850 which includes a requisition order button 1860. The requisition email address module 1850 communicates with the order details submitted module 1870 which generates a message indicating that the customer will receive an email with the order details.

Figure 17:
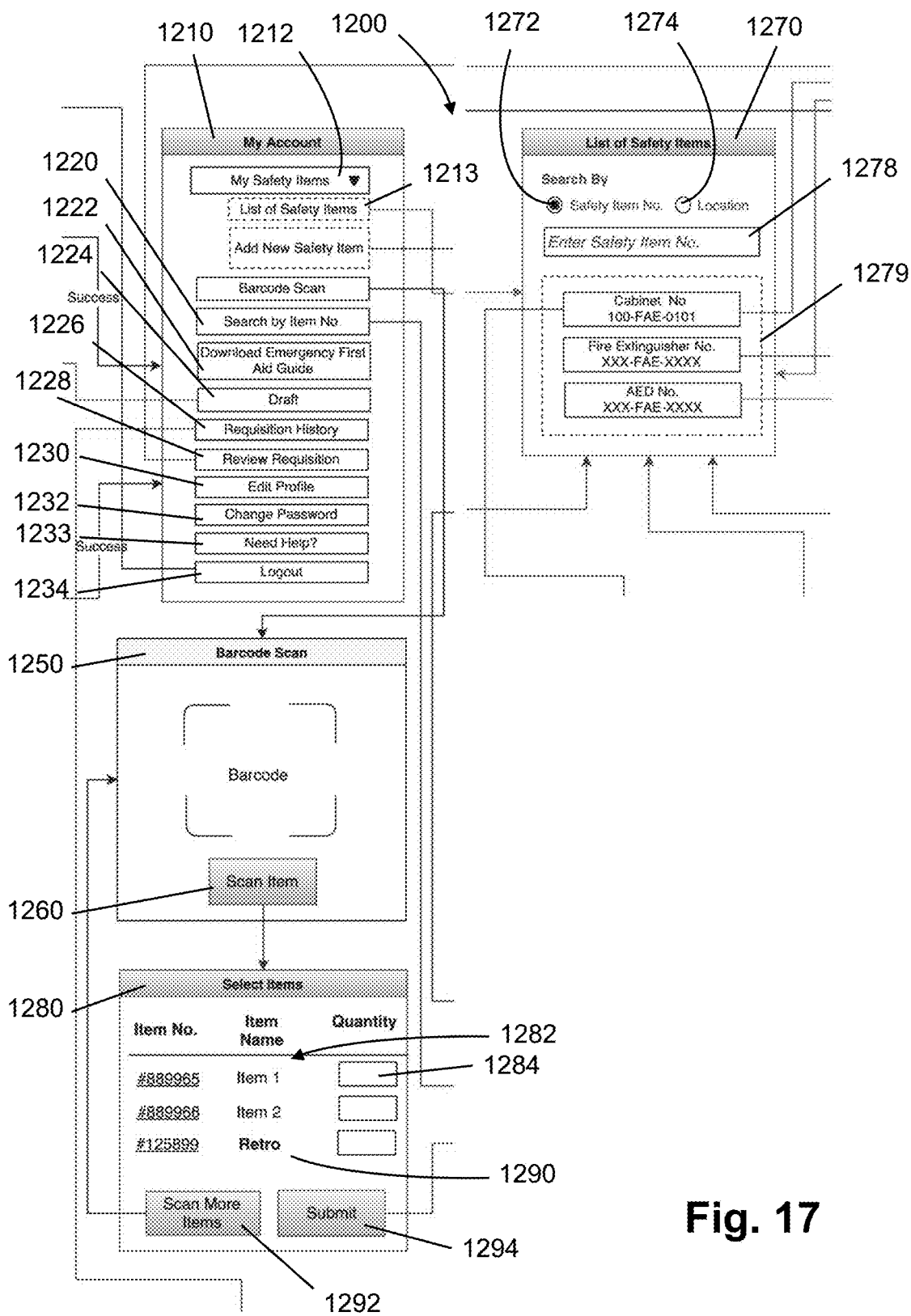

If at the review requisition module 1410, changes are required, an edit button 1418 is pushed and communication is established with the edit order module 1430 which allows for the various quantities to be changed. The edit order module 1430 provides an update button 1440 which communicates back to the review order module 1410, and the order is again reviewed and either a "proceed to order" button 1420 or an edit button 1418 is activated. The "review requisition" module 1410 also has an "add more items" button 1419 which communicates with the list of safety items module 1270 (FIG. 17).

Figure 20:
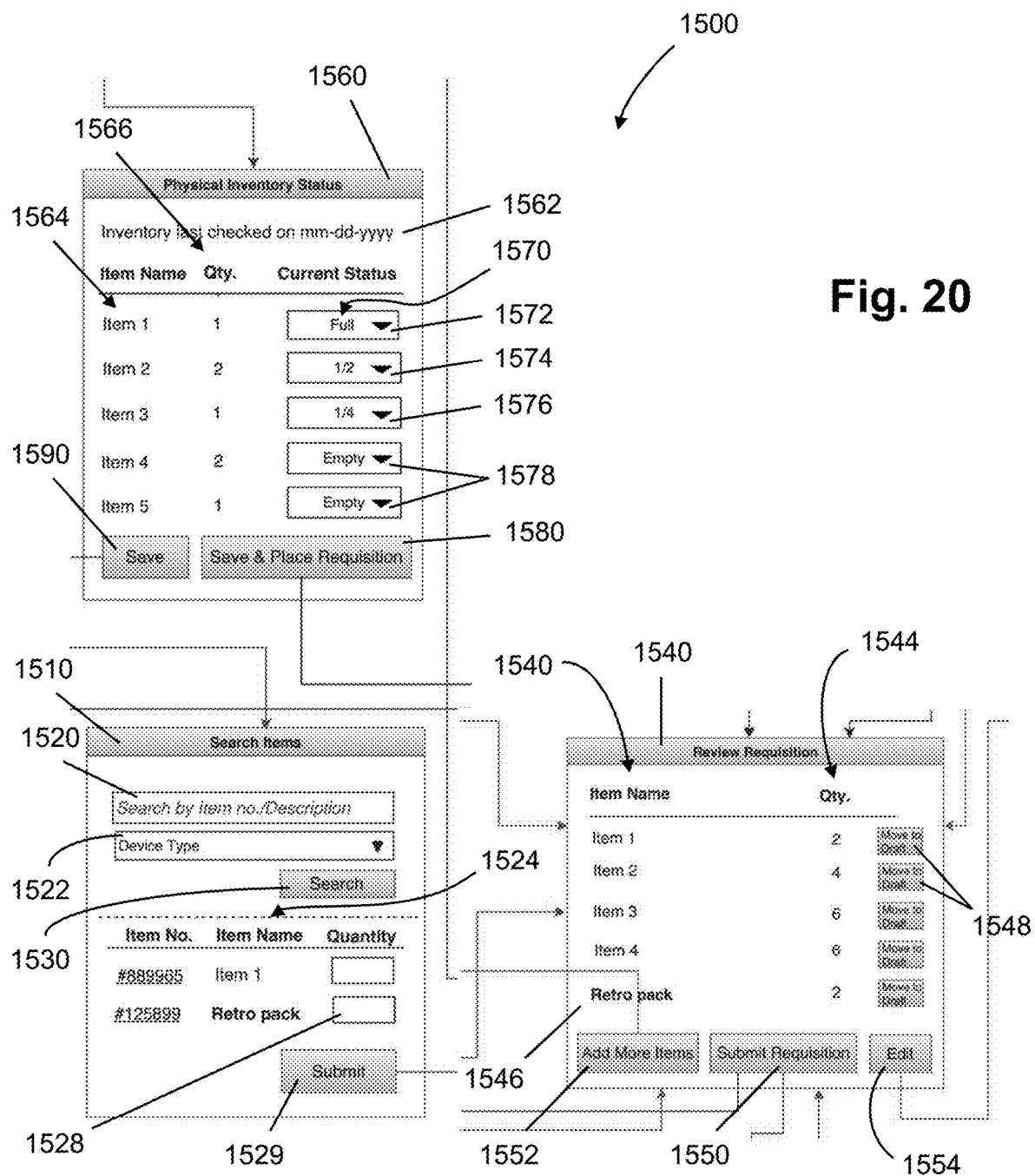

With reference to FIG. 20, subsystem 1500 comprises a search items module 1510. The search items module 1510 receives data from the search by item input port of the "my account" module 1210. The search items module 1510 includes a search by item number description menu 1520 and a menu input 1522 to bring down and indicate the safety device type. A search button 1530 then actuates the selected searching which provides a list 1524 that identifies the item number, the item name and provides a box for indicating the quantity. In addition, a retro pack item inbox 1528 is also provided. The search items module then includes a submit button 1529 which transfers the data to a review module 1540.

Figure 21:
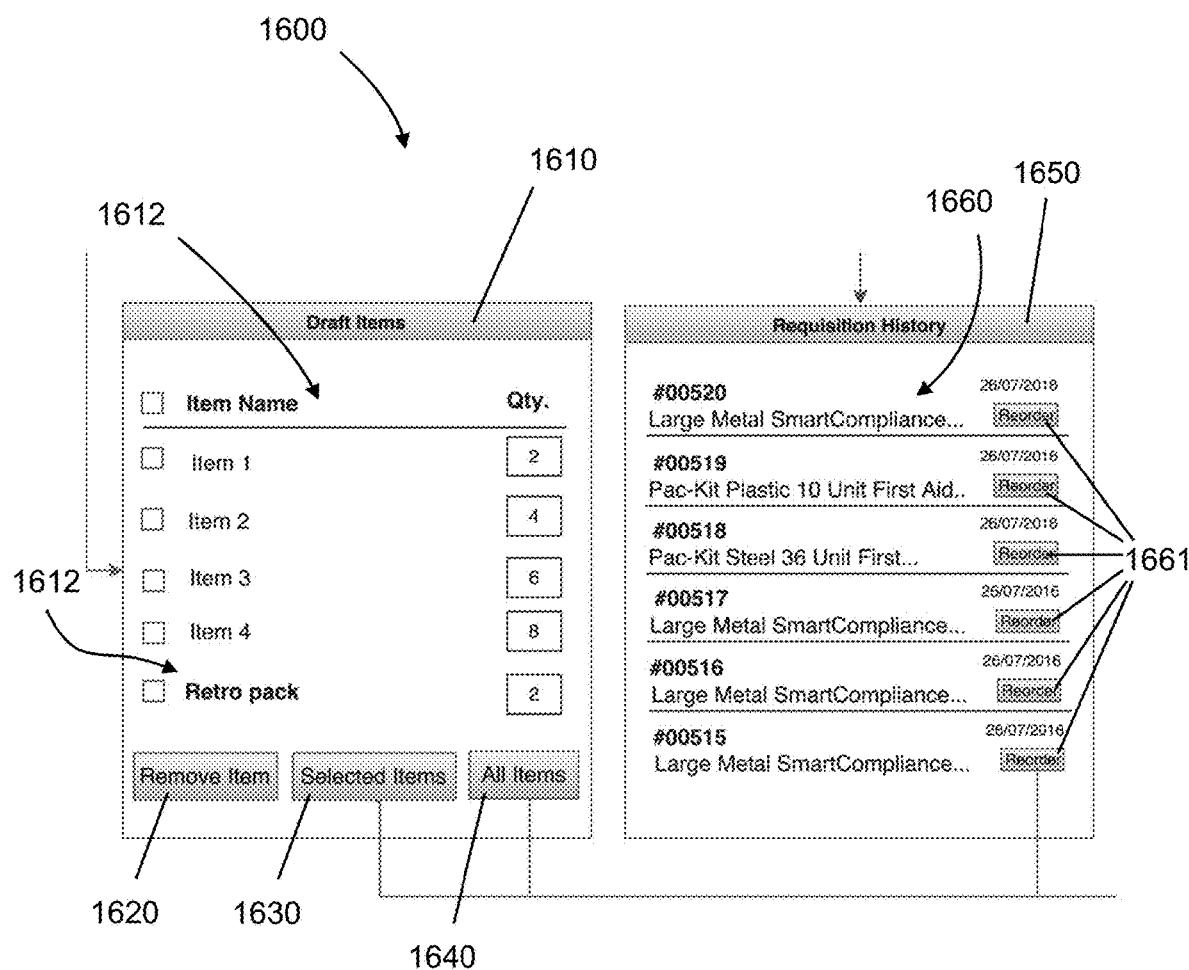

With reference to FIG. 21, subsystem 1600 includes a draft items module 1610 and a requisition history module 1650. The draft items module 1610 receives data and information from the draft output of the "my account" module 1210. The "draft items" module 1610 includes a list 1612 of item names and quantity as well as a retro pack selection 1614 (representative quantities are shown). A remove item button 1620 is provided to remove an item and a button 1630 is provided to order selected items. Another button 1640 can be activated to order all items.

The information is then transferred to the requisition history module 1650 which lists the various safety items and historical information concerning the reordering of the items. The latter information is then transferred to the review requisition module 1540 for review and/or editing and ultimately to the place order button.

With reference to FIG. 21, the requisition history module 1650 compiles a requisition history database 1660 which is similar to database 660 of FIG. 13. The database 1660 includes a list of items ordered, the date of the order, the date of the shipment, the customer, the location or division of the customer for which the order is tended and identifying information concerning the customer including the industry or technology group associated with the customer. A reorder button 1661 is provided for each item.

With reference to FIG. 13, a time period is selected at 662 and the information in the database is sorted by customer at 670. Information for each item order is then sorted and totaled for time period at 672. The information within the customer by division and/or location is also sorted at 674. A customer benchmark is then calculated at 675. The benchmark provides a weighted average of items ordered for the given time period for the customer. The customer benchmark is compared to benchmarks for previous periods (if available at 677).

A customer division benchmark report is then compiled at 679 and transmitted to the customer at 690.

Where applicable, the database information is also sorted by customer group or industry at 680. The group items are sorted and totaled at 682. A group benchmark is then calculated at 685. The group benchmark is compared to other benchmarks for other time periods at 687. A customer group benchmark report is compiled at 689. The reports are then transmitted to the customer at 690 so that the customer can easily view the items purchased for a given time period, compare the items to a previous historic time period and allow for the customer to view how the various divisions compare in relation to the entire customer. In addition, the reports allow the customer to compare its procurement of replacement items to other customers in the group.

Review requisition module 1540 generates a list of items 1542 together with the quantity 1544 for each item. Representative quantities are shown for quantity 1544. The review requisition module also includes a retro pack entry together with the quantities 1546. A move to draft button 1548 is generated for each of the items and quantities which, if upon review, is correct, can be moved to the draft requisition order by activating the move to draft button 1548. The submit requisition button 1550 submits the requisition for place requisition module 1850 (FIG. 23) and to the shipping address module 1810 (FIG. 23). An "add more items" button 1552 communicates back with safety items module 1270. An "add it" button 1454 communicates the data of the review requisition module 1540 to the edit requisition module 1430 (FIG. 19).

With additional reference to FIG. 25, physical inventory status module 1560 receives data from the list of safety items module 1270. The physical inventory status module indicates at 1562 the date that the inventory was last checked. In addition, if applicable, a schematic of the kit or cabinet may be generated so that the location or position of each supply may be readily located. The physical inventory status module also generates a data screen indicating the item name 1564, the quantity for each item 1566 and the current status 1570. The current status allows the user to efficiently check the current inventory status and manually indicate on a screen FULL status, ½ status, ¼ status and EMPTY status 1572, 1574, 1576 and 1578, respectively. The status screens may have a display that takes the form of a word text, a numerical value, a barcode or other quantitative indicator. This aids the user in assessing inventory and affords the user to readily record an indication of the physical inventory. The items designated as ¼ or EMPTY are automatically transferred to the review requisition module 1410. A save and place requisition button 1780 communicates the data to the review requisition module 1410 (FIG. 19). A save button 1590 communicates with the safety items module 1270.

The shipping address module 1810 includes a select cabinet location bring down menu 1812 or an "add new address" button 1820. Button 1820 generates boxes 1822 for entering the first name, last name, address 1, address 2, city, U.S. state/province, ZIP code and phone number. A submit button 1830 submits the data to the "place requisition" module 1850.

Figure 22:
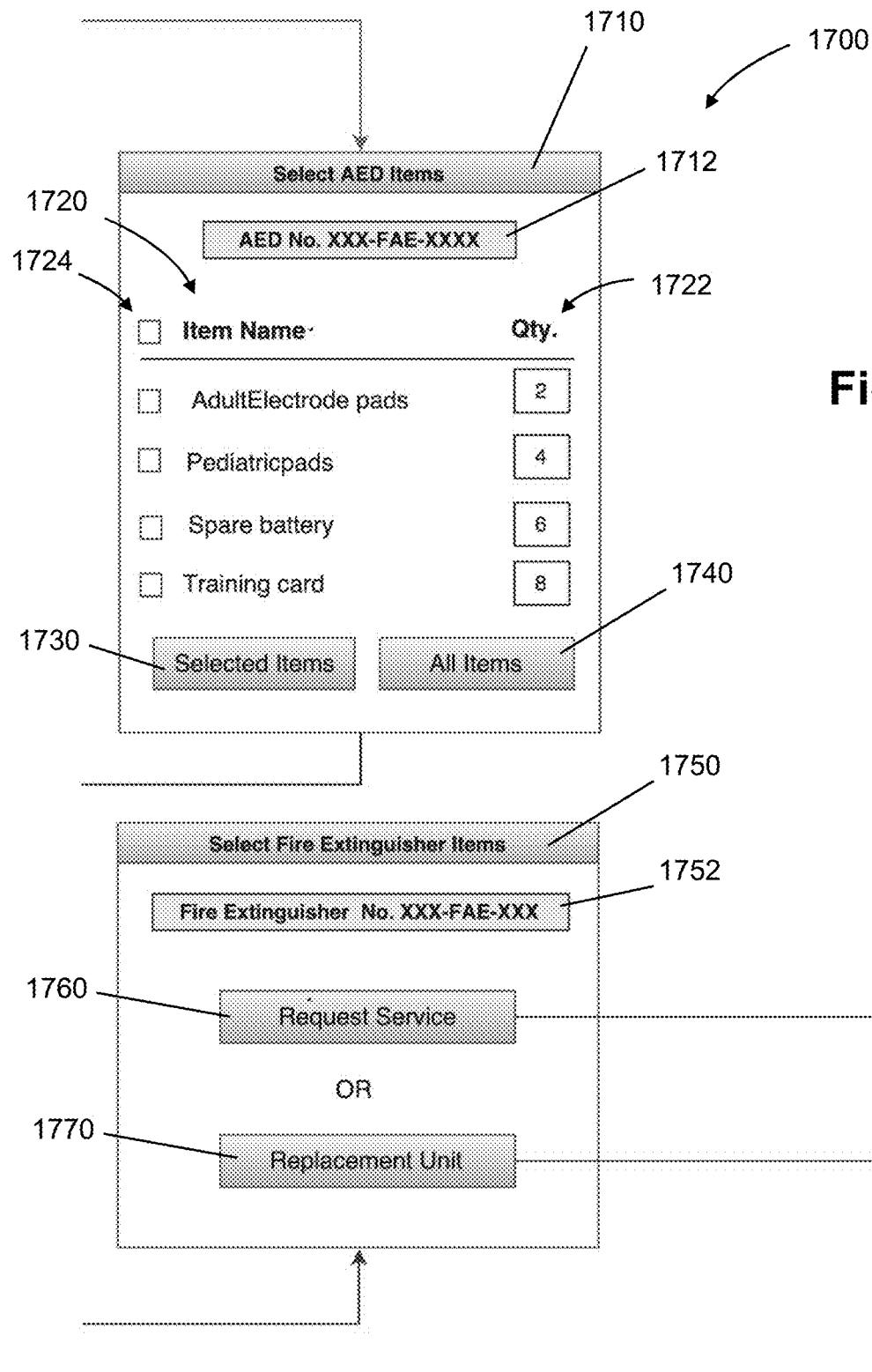

Various selected safety items themselves require various supply items as may be, for example, illustrated in FIG. 22 which describes subsystem 1700 in terms of an AED and a fire extinguisher.

It should be appreciated that subsystem 1700 may be corresponding implement for numerous other safety items (and their supplies, if applicable). A select AED item module 1710 receives data from the list of items module 1210, for example, generated by a listed AED. The AED serial number is listed at box 1712 which also generates a list of items 1720 and quantity 1724. A check box is also provided to indicate which supply items are to be ordered. It will be appreciated that representative item names and quantities have been supplied in FIG. 22. A select items button 1730 or an all items button 1740 is provided which can be activated to communicate the requisition to the review requisition module 1540.

Likewise, a select item fire extinguisher items module 1750 receives data from the safety items module 1210 for a fire extinguisher. A fire extinguisher serial number box 1752 indicates the serial number of the fire extinguisher. A request service button 1760 or a replacement unit button 1770 generates a communication which is communicated to the place requisition module 1850. Safety items such as carbon monoxide detectors, smoke detectors, respirators and AEDs, in addition to replacement of supplies, may also require service at periodic intervals. Such supplies may, for example, take the form of batteries, manuals, pads and filters. Module 1750 is thus also applicable to the latter safety items.

Place requisition module 1850 also receives data from the review requisition module 1550. The place requisition module 1850 includes a box for entering the requisition mail address 1852 as well as boxes 1854 for cc email addresses. A box 1856 for purchase order number and a box 1858 to enter shipping instructions. A place requisition button 1860 sends the data to the requisition details submitted module 1870 which advises the user that the requisition details have been submitted and the user will receive an email with the requisition details. The place requisition module also receives data from select items module 1750 (FIG. 22).

It should be appreciated that all selection buttons, input boxes and input informational screens are transmitted to the remote electronic device 20 for selection and input by the customer or end user at the device. In addition, all reports and communications generated by the requisition system are electronically forwarded to the remote electronic device for review by the customer. The requisitions are electronically forwarded to the supplier. Naturally, the ordered replacement items as well as the subscription items are ultimately shipped to the address designated by the customer.

Figure 26:
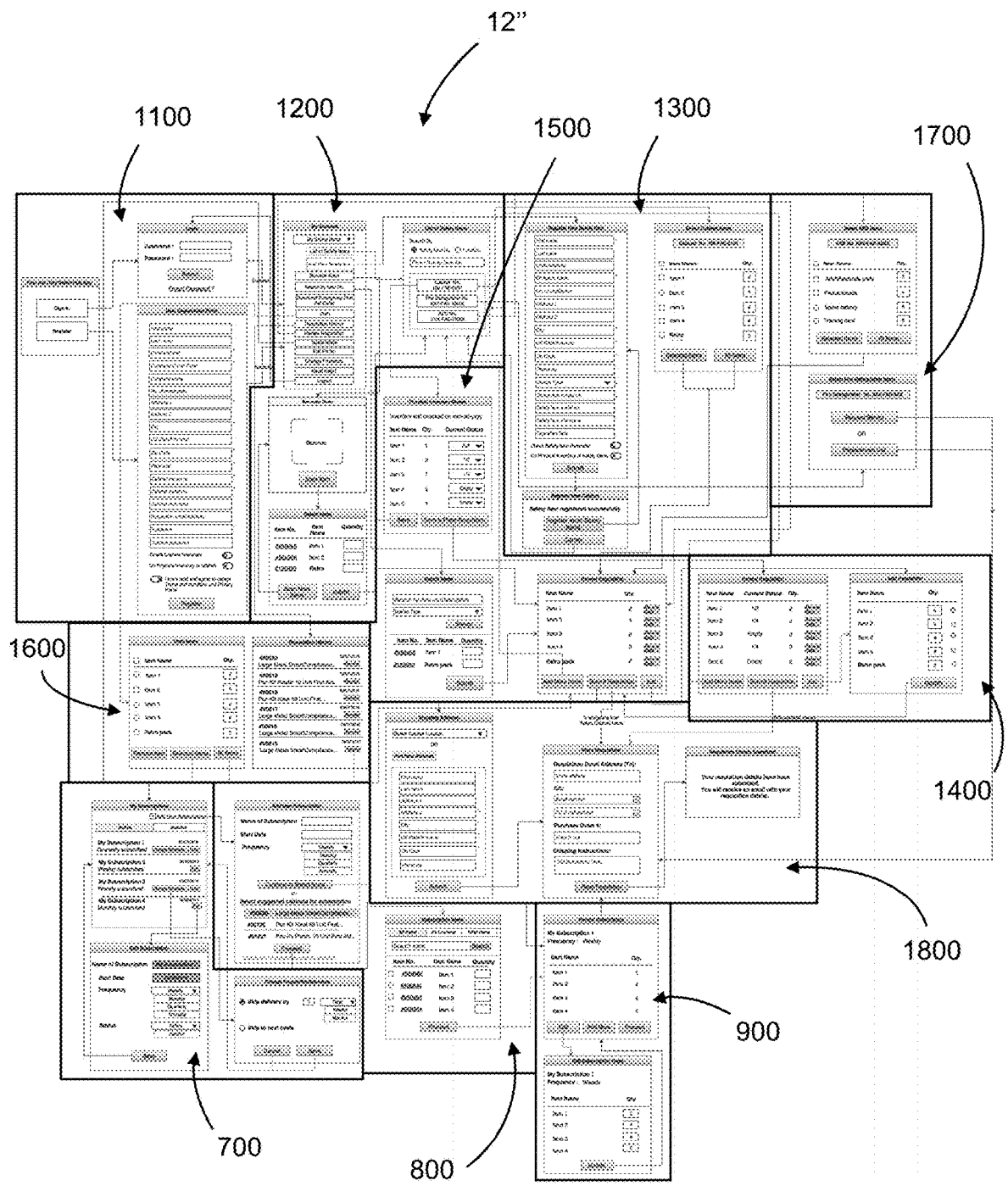
FIG. 26 is a flowchart for a third embodiment of a requisition system for multiple safety items with automatic replenishment and inventory monitoring.

A requisition system 10" for multiple safety items which incorporates, in addition to the features of requisition system 10', an automatic replenishment feature has a flowchart which is generally designated by the numeral 12" in FIG. 26. Flowchart 12" comprises the eight related subsystems 1100, 1200, 1300, 1400, 1500, 1600, 1700, 1800 previously described in FIGS. 16-23, plus the subsystems 700, 800 and 900 previously described with reference to FIGS. 8-10.

The interface between the subsystems of flowchart 12" with the subsystems of requisition system 10' and subsystems 700, 800 and 900 of requisition system 10 requires a slight modification of the previously described interfaces between the respective subsystems. In flowchart 12", subsystem 700 comprises a "my subscription" module 710 which is activated from the "my account" module 1210 rather than module 210. The output from the "proceed" button 950 of requisition system module 910 is communicated to the "place requisition" module 1550.

While preferred embodiments of the foregoing requisition systems have been set forth for purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. A requisition system for a first aid kit having a plurality of first aid supplies comprising:
    applying a unique serial number to the first aid kit;
    electronically scanning or entering the serial number;
    using the serial number to identify the first aid kit;
    using the serial number to identify the customer of the first aid kit or entering the customer of the first aid kit in a first database;
    accessing a list of replacement supplies for the first aid kit or designating a pre-established list of replacement supplies for the first aid kid into a second database;
    automatically generating a communication indicating the replacement supplies of the second database;
    employing said first and second databases to compile an order of first aid supplies for the first aid kit.

2. The requisition system of claim 1 further comprising using the serial number to generate a selection menu of replacement first aid supplies.

3. The requisition system of claim 1 further comprising using the serial number to generate a list of first aid supplies that make the first aid kid compliant with contemporary safety standards.

4. The requisition system of claim 1 further comprising compiling an order history and electronically forwarding the order history to a customer.

5. The requisition system of claim 1 further comprising scanning a container for a selected first aid supply, electronically identifying said selected supply and entering said selected supply in said second database.

6. The requisition system of claim 1 further comprising deriving a customer order history for a given time period and calculating a customer benchmark.

7. The requisition system of claim 6 further comprising compiling a division order history of the customer for the given time period, calculating a division benchmark and comparing each division benchmark to the customer benchmark.

8. The requisition system of claim 6 wherein the step of deriving a customer order history for a given time period and calculating a customer benchmark is performed for multiple customers and further comprising calculating a group benchmark of said customer benchmarks.

9. The requisition system of claim 1 wherein entering a single input orders a complete set of replacement contents for a selected first aid kit.

10. The requisition system of claim 1 wherein a single input orders all replacement contents required to comply with contemporary standards for a selected first aid kit.

11. The requisition system of claim 1 further comprising entering data for an automatic subscription into the first database.

12. The requisition system of claim 11 further comprising editing the subscription data to change kits embraced by the subscription, a requisition period and/or a delivery schedule.

13. The requisition system of claim 1 further comprising generating a schematic illustration of a position of each said supply in the first aid kit.

\* \* \* \* \*